United States Patent
Yamada et al.

(10) Patent No.: US 7,777,692 B2
(45) Date of Patent: Aug. 17, 2010

(54) MULTI-SCREEN VIDEO REPRODUCING SYSTEM

(75) Inventors: Norihiko Yamada, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1427 days.

(21) Appl. No.: 11/036,345

(22) Filed: Jan. 18, 2005

(65) Prior Publication Data

US 2005/0174482 A1    Aug. 11, 2005

(30) Foreign Application Priority Data

Jan. 26, 2004    (JP)    ............................ 2004-017254
Nov. 5, 2004    (JP)    ............................ 2004-321614

(51) Int. Cl.
*H04N 9/76* (2006.01)
(52) U.S. Cl. ..................... 345/2.1; 345/1.3; 345/2.2; 345/2.3; 348/383; 348/500
(58) Field of Classification Search ........... 345/1.1–3.4, 345/213; 348/207, 211, 212, 383, 500
See application file for complete search history.

(56) References Cited

U.S. PATENT DOCUMENTS 7,350,923 B2 *    4/2008    Olson et al. ................... 353/30
2003/0067419 A1 *    4/2003    Lambert ..................... 345/1.1

FOREIGN PATENT DOCUMENTS

JP    2002-369163    12/2002
JP    2003-235027    8/2003

* cited by examiner

*Primary Examiner*—Amare Mengistu
*Assistant Examiner*—Jennifer Zubajlo
(74) *Attorney, Agent, or Firm*—Oliff & Berridge, PLC

(57) ABSTRACT

Exemplary embodiments of the present invention provide a multi-screen video reproducing system capable of performing synchronized video reproduction for a long time by using a simple system without recognizing an absolute time. The multi-screen video reproducing system comprises a LAN functioning as a network; a plurality of rendering units RU1 to RU4 connected to the LAN to output video data to a corresponding display device of a plurality of display devices D1 to D4; and a video distribution server VS which is connected to the LAN and which distributes the video data to the plurality of rendering units RU1 to RU4 and distributes timing information to the plurality of rendering units RU1 to RU4 through a simultaneous broadcast communication.

34 Claims, 26 Drawing Sheets

MULTI-SCREEN VIDEO REPRODUCING SYSTEM

BACKGROUND

Exemplary embodiments of the present invention relates to a multi-screen video reproducing system suitable for a video reproducing device in a multi-screen display having a large screen. Further, exemplary embodiments provide a video reproducing method in the multi-screen video reproducing system, a timing server and a rendering unit used in the multi-screen video reproducing system, and a display device constituting the multi-screen display.

FIG. 23 is a diagram for describing a multi-screen display. A multi-screen display D is a display constituting one large screen by assembling a plurality of display devices D1 to D4, such as a monitor or projector, as shown in FIG. 17. A multi-screen video reproducing system is a video reproducing device for outputting the video signal input to the respective display devices D1 to D4 of the multi-screen display D.

In the related art, the multi-screen video reproducing system converts a video signal corresponding to a large screen (video signal corresponding to an original video) into each video signal corresponding to each of the display devices D1 to D4 (video signal corresponding to each unit video) through a scan converter so that the converted video signal is input to each of the display device D1 to D4, thereby addressing or achieving the large screen display.

In the related art, the video signal has been digitized. As a result, also in the multi-screen video reproducing system, a demand that the video signal should be handled in the form of the digital signal has increased.

However, when the video signal is handled in the form of the digital signal, the video signal is not automatically synchronized between the display devices D1 to D4, differently from the case of using the scan converter. Therefore, it is required to provide a synchronized reproducing device in order to synchronize the video signal.

Specifically, when the synchronized reproducing device is provided, since the video signal can be synchronized between the display devices D1 to D4, unit video displayed by the respective display devices can be reproduced at an accurate timing and smooth and natural video can be reproduced on the screen as a whole, as shown in FIG. 24A. To the contrary, when the synchronized reproducing device is not provided, since the video signal can not be synchronized between the display devices D1 to D4, unit video displayed by the respective display devices can not, be reproduced at an accurate timing and smooth and natural video can not be reproduced on the screen as a whole, as shown in FIG. 24B.

Related art document Japanese Unexamined Patent Application Publication No. 2002-369163 and related art document '3D Interactive Processor for 3D moving images' collection of lectured documents, 3D Image Conference 2003, 3D Image Conference 2003 executive committee (2003), PP125-128 disclose the synchronized reproducing device to synchronize a plurality of video displays or synchronize the video and audio.

FIG. 25 is a diagram for describing the synchronized reproducing device disclosed in related art document Japanese Unexamined Patent Application Publication No. 2002-369163. As shown in FIG. 25, when the plurality of video signals (streams) are transmitted through an internet, the synchronized reproducing means disclosed in related art document Japanese Unexamined Patent Application Publication No. 2002-369163 absorbs the variation of time caused by the rush circumference of the network 9 from a transmission side system shown in FIG. 25A to a reception side system shown in FIG. 25B and the difference of processing time required to compress and decompress streams 1 and 2 to thus synchronize the video signals between the display devices.

In other words, the transmission side system appends a time code at the time of being distributed to a plurality of distributed streams to thus transmit them to the network. The reception side system receives the plurality of streams through the plurality of receiving devices 11 and 14 to thus output them as the streams. In addition, the difference between the time code of an absolute reference time at the reception side system and the distribution time code appended to the stream is measured about each output stream. And then, the delay of the output of each stream is controlled such that the difference between the time codes of the streams becomes constant. In this manner, the video signals are synchronized between the display devices.

FIG. 26 is a diagram for describing the synchronized reproducing means disclosed in document 'moving picture display by three-dimensional interactive processor' collection of lectured documents, three-dimensional image conference 2003, three-dimensional image conference 2003 executive committee (2003), PP125-128 therein. The synchronized reproducing device disclosed therein connects to a LAN (Local Area Network) a host PC for generating video reproducing timing and a cluster PC (PC 1, PC 2, PC 3, ..., PC N) for outputting video signals (video 1, video 2, video 3, ..., video N) to display devices, simultaneously distributes broadcast packets functioning as synchronization signals from the host PC to each PC, and synchronizes the video signals between the display devices, as shown in FIG. 26. As a result, the frame difference between the display devices can be suppressed to be smaller than one frame.

In addition, related art document Japanese Unexamined Patent Application Publication No. 2003-235027 discloses a technology for synchronizing the video signal between the display devices, in addition to related art document Japanese Unexamined Patent Application Publication No. 2002-369163 and related art document Japanese Unexamined Patent Application Publication No. 2003-235027.

According to related art document Japanese Unexamined Patent Application Publication No. 2003-235027, when a plurality of members receive common video data from a distribution server using a plurality of terminal devices and reproduces them, if the difference in reception time is occurred at the respective terminal devices, the difference in the scene which the plurality of members sees through the terminal devices is occurred so that smooth communication can not be addressed or achieved between the members. In order to address or solve the above-mentioned and/or other problems, disclosed is an art to synchronize the video reproduction in the plurality of terminal devices.

According to related art document Japanese Unexamined Patent Application Publication No. 2003-235027, first, the time of the video distribution server and the respective terminal devices are unified by using the time distribution server provided on the network. Next, the video distribution server distributes to the respective terminal devices the multicast packets including information indicating the video data and the distribution time. The respective terminal devices receive the distributed multicast packets, distribute the information of the transmission time and reception time to any one of the terminal devices, and gather the information of the reception time difference into one location. In addition, a maximum transmission delay time is calculated from the information of time, a reproducing timing control section of each terminal device adjusts the reproducing timing of the video data using the time as a reference, and then the synchronization can occur.

SUMMARY

However, in the synchronized reproducing device disclosed in related art document Japanese Unexamined Patent Application Publication No. 2002-369163, it is necessary to generate the accurate time code at both the transmission side system and the reception side system. For this reason, the transmission side system and the reception side system must recognize the absolute time. Therefore, it is required that the transmission side system and the reception side system have an internal clock built therein or receive the time signal distributed from a GPS (Global Positioning System) satellite or communicate with an outside time server based on a NTP (Network Time Protocol). As a result, there is a problem in that the system becomes large, the handling of the system becomes complicated, and the cost cannot be reduced.

Further, in the synchronized reproducing device disclosed in related art document 'moving picture display by three-dimensional interactive processor' collection of lectured documents, three-dimensional image conference 2003, three-dimensional image conference 2003 executive committee (2003), PP125-128, since all reproduced video data is expanded in a memory functioning as the frame buffer, a memory having a large capacity is required. In general, such a memory is expensive, and the cost involved with minutes of video data in the memory is very high. More, in the case of handling several hours of video data of a movie, all video data cannot be expanded in the memory.

Also, in the synchronized reproducing device disclosed in related art document Japanese Unexamined Patent Application Publication No. 2003-235027, similar to related art document Japanese Unexamined Patent Application Publication No. 2002-369163, since it is necessary to communicate with the time server, there is a problem in that the system becomes large, the handling of the system becomes complicated, and the cost cannot be reduced.

Accordingly, exemplary embodiments of the present invention are designed to address or solve the above-mentioned and/or other problems. It is an object of exemplary embodiments of the present invention to provide a multi-screen video reproducing system and a video reproducing method of the multi-screen video reproducing system capable of easily performing synchronized video reproduction for a long time by using a simple system without recognizing an absolute time.

(1) A multi-screen video reproducing system of exemplary embodiments of the present invention includes a network; a plurality of rendering units connected to the network to output video data to a corresponding display device of a plurality of display devices; and a video distribution server connected to the network and having a function to distribute the video data to the plurality of rendering units and a function to distribute to the plurality of rendering units through a simultaneous broadcast communication, timing information to output synchronized video data from the plurality of rendering units to the corresponding display devices.

According to the multi-screen video reproducing system of exemplary embodiments of the present invention, the video data is distributed from a video distribution server which has a function to distribute the video data to the plurality of rendering units and a function as a timing server to the plurality of rendering units through a simultaneous broadcast communication using the network, and then by distributing timing information at a predetermined timing, the respective rendering units output the respective display devices the video data distributed from the video distribution server based on the timing information distributed from the same video distribution server. As a result, all video distribution servers functioning as the distribution side and the respective rendering units functioning as the reception side can perform a synchronized reproduction of video on the respective display devices without recognizing an absolute time. Therefore, it is not required that the timing server functioning as the distribution side and the respective meandering units functioning as the reception side have a much accurate internal clock built therein or receive the time signal distributed from a GPS satellite or communicates with an external time server based on a NTP. As a result, it is possible to perform the synchronized reproduction of video with a simple system capable of easily being handled and/or a small price.

Further, according to the multi-screen video reproducing system of exemplary embodiments of the present invention, since the video data which should be displayed is distributed from the video distribution server, the respective plotting units does not need a video data storage device to store all video data which should be displayed, a necessary minimum of video data (for example, frame unit) once distributed from the video distribution server may be temporally stored in the frame buffer, and it is possible to display the video data for a long time.

Further, the multi-screen video reproducing system of exemplary embodiments of the present invention is suitable for the case in which the video reproduction is performed on the multi-screen display such as the tiling display. In addition, the multi-screen video reproducing system of exemplary embodiments of the present invention may be applied to the case in which a plurality of users plays the same game at different locations in all direction while seeing the respective displays.

According to the multi-screen video reproducing system according to (1), the video distribution server includes a video data generating section to generate the video data to be distributed to the plurality of rendering units; a timing information generating section to generate the timing information; and a transmitting section for distribute to the plurality of rendering units the video data generated by the video data generating section or the timing information generated by the timing information generating section. Preferably, the rendering unit includes a receiving section to receive the video data or timing information distributed by the transmitting section; a frame buffer to expand the video data received by the receiving section; an output control section to control the frame buffer based on the timing information received by the receiving section; and an output section to output the video data expanded in the frame buffer to the corresponding display device.

With the above-mentioned structure, it is possible to easily address or achieve the multi-screen video reproducing system according to (1). In addition, in the multi-screen video reproducing system, the 'expansion' of the video data into the frame buffer means that the compressed or enciphered video data is decompressed or decoded to be stored into the frame buffer, in addition to the video data distributed from the video distribution server storing into the frame buffer as it is.

(3) In the multi-screen video reproducing system according to (1) or (2), the video distribution server can distribute the same video data to the plurality of rendering units through the simultaneous broadcast communication.

As a result, it is possible to provide a multi-screen video reproducing system which is suitable for the case of displaying the same video with the plurality of rendering units. In addition, in the case of the same video data, the plurality of rendering units holds the region allocated to each of the rendering units and can output as the partial video the video corresponding to the region allocated to each of the rendering units. Therefore, the multi-screen video reproducing system may be applied to the tiling display constituting one large screen obtained by integrating the plurality of partial video.

(4) In the multi-screen video reproducing system according to (1) or (2), the video distribution server can individually distribute corresponding video data to the plurality of rendering units individually.

This is an example that the video data to be displayed by each rendering unit is individually distributed to each rendering unit. For example, the partial video is output to the plurality of display devices so that it is possible to address or achieve the tiling display constituting one large screen obtained by integrating the plurality of partial video, or exemplary embodiments of the present invention can also be applied to the case in which the plurality of display devices of the multi-screen display synchronize and reproduce the video having the different points of view photographed by the different cameras. In addition, in the case of (4), since the video distribution server individually distributes the video data corresponding to the plurality of rendering units to the respective rendering units, each rendering unit can obtain the same effect without performing the process such as the video processing.

(5) The multi-screen video reproducing system according to any one of (1) to (4), the video distribution server distributes the timing information to the plurality of rendering units every a frame update period of the video data.

As such, the timing information is distributed to each rendering unit every the frame update period of the video data so that the video data synchronized with high accuracy for each frame can be output from each rendering unit. As a result, the synchronized reproduction can be performed with high accuracy.

(6) In the multi-screen video reproducing system according any one of (1) to (4), the video distribution server can distribute the timing information to the plurality of rendering units at every display timing of all of the frames of the video data.

(7) In the multi-screen video reproducing system according to any one of (1) to (4), the video distribution server can distribute the timing information to the plurality of rendering units at every display timing of a part of the frames of the video data.

This is one that the timing information is distributed every frame and the timing information therebetween is set by the rendering unit. In this case, the plurality of rendering units can output the synchronized video data to the corresponding display devices. In addition, according to this exemplary aspect of the present invention, times of the distribution of the timing information can be reduced and the traffic of the network can be alleviated.

(8) In the multi-screen video reproducing system according to any one of (1) to (7), the simultaneous broadcast communication is preferably a broadcast communication.

According to the above-mentioned structure, it is possible to easily address or achieve the simultaneous broadcast communication to the respective rendering units connected to the network.

In addition, in this case, even though the number of the display deices constituting the multi-screen display is changed (when the number of the rendering units constituting the multi-screen video reproducing system is changed), it is possible to address or achieve a multi-screen video reproducing system having excellent expandability without changing the structure of the simultaneous broadcast communication.

(9) In the multi-screen video reproducing system according to any one of (1) to (7), the simultaneous broadcast communication is preferably a multicast communication.

According to the above-mentioned structure, it is possible to easily address or achieve the simultaneous broadcast communication to the respective rendering units connected to the network.

In addition, in this case, even though the number of the display deices constituting the multi-screen display is changed (when the number of the rendering units constituting the multi-screen video reproducing system is changed), by properly changing the address related to the multicast communication of each rendering unit, it is possible to maintain the structure of the simultaneous broadcast communication. In addition, similarly to (8), it is possible to address or achieve a multi-screen video reproducing system having excellent expandability.

(10) In the multi-screen video reproducing system according to any one of (1) to (8), the network is preferably a local area network.

According to the above-mentioned structure, the packet loss or the difference in the arrival time of the packets to the respective rendering units can be easily reduced so as to become equal to or smaller than an allowable value and it is possible to easily address or achieve the simultaneous broadcast communication with high time accuracy. As a result, the synchronized reproduction with high accuracy can be addressed or achieved between the respective display devices and it is possible to reproduce the video with smooth and natural as a whole.

In addition, since the respective display devices constituting the multi-screen display are generally arranged at location adjacent to each other, it is sufficient to use the local area network as the network and thus a wide area network is not necessarily used.

(11) In the multi-screen video reproducing system according exemplary embodiments of to any one of (1) to (9), a communication protocol used for the network is preferably TCP/IP.

In the multi-screen video reproducing system of exemplary embodiments of the present invention, various communication protocols may be used as the communication protocol. However, as described above, by using TCP/IP protocol (Transport Control Protocol/Internet Protocol) widely used in recent times, it is possible to easily constitute the network with low cost and sure.

(12) In the multi-screen video reproducing system according to any one of (2) to (11), the frame buffer is preferably composed of a frame buffer having a region capable of storing a plurality of frames of the video data.

As such, by using the frame buffer having the region capable of storing the plurality of frames of the video data, for example, when the frame buffer has a region capable of storing two frames, the video data related to the previously read/expanded corresponding frame is output to each display device in the region capable of storing one frame and the video data related to a subsequent frame distributed from the video distribution server is read/expanded in the region capable of storing the other frame. In addition, at a next timing, the video data related to the previously read/expanded subsequent frame is output to each display device in the region capable of storing the other frame and the video data related to a further subsequent frame distributed from the video distribution server is read/expanded in the region capable of storing one frame. In addition, by repeating this operation, each rendering unit can output the synchronized video data to each display device with accuracy.

In the above-mentioned description, it is described about the case in which the video data for each frame is buffered in the frame buffer having the region capable of storing the plurality of frames of the video data. However, the video data for frames equal to or more than two frames may be buffered in the frame buffer. In this case, since the video data for one or more frames is previously read, the efficient buffering can be addressed or achieved.

In addition, in the frame buffer having the region capable of storing a plurality of frames of the video data, the frame buffer may be composed of a plurality of memories and may be composed of one LSI (Large Scale Integration circuit).

(13) In the multi-screen video reproducing system according to (12), the frame buffer having the region capable of storing the plurality of frames of the video data is preferably two frame buffers which constitute double buffering.

Thereby, it is possible to easily address or achieve the frame buffer according to (12).

(14) In the multi-screen video reproducing system according to any one of (1) to (13), any one of the plurality of rendering units can function as the video distribution server.

As such, one rendering unit has the function as the video distribution server so that it is not necessary to individually arrange the video distribution server, thereby simplifying the system.

(15) In the multi-screen video reproducing system according to any one of (1) to (14), the plurality of display devices is a plurality of display constituting a multi-screen display. The multi-screen video reproducing system is preferably a multi-screen video reproducing system for outputting synchronized video data to each of the plurality of display devices.

According to the exemplary aspect of the present invention, it is possible to address or achieve the multi-screen video reproducing system which is suitable for the case of performing the video reproduction on the multi-screen display such as the tiling display.

(16) The multi-screen video reproducing system of exemplary embodiments the present invention includes a plurality of rendering units which has a network interface and a function to output to the plurality of display devices corresponding to the plurality of rendering units video data acquired through the network interface; and a video distribution server which has a network interface, a function to distribute video data to the plurality of rendering units through the network interface and a function to distribute to the plurality of rendering units, through a simultaneous broadcast communication via the network interface, timing information to output synchronized video data from the plurality of rendering units to the corresponding display, devices.

In the multi-screen video reproducing system according to (16), the network is separately provided so that it is possible to constitute the multi-screen video reproducing system according to (1). In addition, the same effect as the multi-screen video reproducing system according to (1) can be obtained. In addition, the multi-screen video reproducing system has preferably the same feature as that of the above-mentioned multi-screen video reproducing systems according to (2) to (14).

(17) In the multi-screen video reproducing system according to (16), the plurality of display devices is a plurality of display devices constituting a multi-screen display, and the multi-screen video reproducing system is a multi-screen video reproducing system for outputting the synchronized video data to each of the plurality of display devices.

According to this exemplary aspect of the present invention, it is possible to address or achieve the multi-screen video reproducing system which is suitable for the case of performing the video reproduction on the multi-screen display such as the tiling display.

(18) A multi-screen video reproducing system of exemplary embodiment of the present invention includes a network; a plurality of rendering units connected to the network to output video data to a corresponding display device of a plurality of display devices; a video distribution server connected to the network to distribute the video data to the plurality of rendering units; and a timing server connected to the network and having a function to distribute to the plurality of rendering units, through a simultaneous broadcast communication, timing information to output synchronized video data from the plurality of rendering units to the corresponding display devices.

This is one that the function as the timing server is separated from the video distribution server and the timing server is provided independently from the video distribution server. As such, the timing server is provided independently from the video distribution server so that the load of the process of the video distribution server can be alleviated. In addition, any one of the plurality of rendering units can serve as the timing server. As a result, the effect that the degree of freedom can increase in structure is obtained.

In addition, the multi-screen video reproducing system according to (18) can the same feature as the multi-screen video reproducing systems according to (3) to (14).

(19) In the multi-screen video reproducing system according to (18), the timing server includes a timing information generating section to generate the timing information; a video distribution control information generating section to generate video distribution control information concerning the video distribution server; and a transmitting section to output the timing information or video distribution control information. The video distribution server includes a video distribution control section to control the video distribution to the plurality of rendering units based on the video distribution control information generated by the video distribution control information generating section of the timing server, a video data generating section to generate video data to be distributed to the plurality of rendering units by the video distribution control section, and a transmitting section to distribute to the plurality of rendering units the video data generated by the video data generating section. The rendering unit includes a receiving section to receive the video data or timing information distributed by the transmitting section; a frame buffer to expand the video data received by the receiving section; an output control section to control the frame buffer based on the timing information received by the receiving section; and an output section to output the video data expanded in the frame buffer to the corresponding display device.

According to the above-mentioned structure, it is possible to easily address or achieve the multi-screen video reproducing system according to (18). In addition, the video distribution server performs the video distribution control to each rendering unit based on the video distribution control information (the acquisition of the video data to be distributed or conversion of the acquired video data into packets and the distribution of the packetized video data to each rendering unit). For this reason, the video distribution server side can perform the video distribution control at the proper timing. Since the video distribution server does not need to generate the video display timing, the load of the process of the video distribution server can be alleviated.

(20) In the multi-screen video reproducing system according to (18) or (19), any one of the plurality of rendering units can function as any one of the video distribution server and the timing server or function as both the video distribution server and the timing server.

As such, any rendering unit has the functions as the video distribution server and the timing server so that it is not necessary to separately arrange the video distribution server and the timing server, thereby simplifying the multi-screen video reproducing system.

(21) In the multi-screen video reproducing system according to any one of (18) to (20), the plurality of display device is a plurality of display devices constituting a multi-screen display and the multi-screen video reproducing system is a multi-screen video reproducing system to output the synchronized video data to each of the plurality of display devices.

According to this exemplary aspect of the present invention, it is possible to address or achieve the multi-screen video reproducing system which is suitable for the case of performing the video reproduction on the multi-screen display such as the tiling display.

(22) A multi-screen video reproducing system of exemplary embodiments of the present invention includes a plurality of rendering units having a network interface and a function to output video data acquired through the network interface to a corresponding display device of a plurality of display devices; a video distribution server having a network interface and a function to distribute video data to the plurality of rendering units through the network interface; and a timing server having a network interface and a function to distribute video data to the plurality of rendering units through the network interface and a function to distribute to the plurality of rendering units, through a simultaneous broadcast communication via the network interface, timing information to output synchronized video data from the plurality of rendering units to the corresponding display devices.

In the multi-screen video reproducing system according to (22), the network is separately provided so that it is possible to constitute the multi-screen video reproducing system according to (18). In addition, the same effect as the multi-screen video reproducing system according to (18) can be obtained. In addition, the multi-screen video reproducing system according to (22) has preferably the same feature as that of the above-mentioned multi-screen video reproducing systems according to (3) to (14), (19) and (20).

(23) In the multi-screen video reproducing system according to (22), the plurality of display device is a plurality of display devices constituting a multi-screen display, and the multi-screen video reproducing system is a multi-screen video reproducing system to output the synchronized video data to each of the plurality of display devices.

According to this exemplary aspect of the present invention, it is possible to address or achieve the multi-screen video reproducing system which is suitable for the case of performing the video reproduction on the multi-screen display such as the tiling display.

(24) A video reproducing method of a multi-screen video reproducing system of exemplary embodiments the present invention including a plurality of rendering units to output video data to a corresponding display device of a plurality of display devices; and a video distribution server which has a function to distribute the video data to the plurality of rendering units and a function to distribute to the plurality of rendering units, through a simultaneous broadcast communication, timing information to output synchronized video data from the plurality of rendering units to the corresponding display devices, the multi-screen video reproducing system outputting the synchronized video data to each of the plurality of display devices, the video distribution server including distributing video data to the plurality of rendering units and distributing the timing information to the plurality of rendering units through a simultaneous broadcast communication at a predetermined timing after the distribution of the video data. The plurality of rendering units including outputting the received video data to corresponding display devices on the basis of the timing information, when receiving the timing information distributed from the video distribution server after the reception of the video data distributed from the video distribution server.

According to the video reproducing method of the multi-screen video reproducing system, the same effect as the multi-screen video reproducing system according to (1) can be obtained.

In addition, in the video reproducing method of the multi-screen video reproducing system of exemplary embodiments of the present invention, the multi-screen video reproducing system has preferably the same feature as the multi-screen video reproducing systems according to (2) to (14).

(25) In the video reproducing method of the multi-screen video reproducing system according to (24), the multi-screen video reproducing system is preferably a multi-screen video reproducing system to output the synchronized video data to each of the plurality of display devices constituting a multi-screen display.

According to this exemplary embodiments aspect of the present invention, it is possible to address or achieve the multi-screen video reproducing method which is suitable for the multi-screen video reproducing system of exemplary embodiments of performing the video reproduction on the multi-screen display such as the tiling display.

(26) A video reproducing method of a multi-screen video reproducing system of exemplary embodiments of the present invention including a network; a plurality of rendering units connected to the network to output video data to a plurality of display devices, constituting a multi-screen display, respectively corresponding to the plurality of rendering units; a video distribution server connected to the network and having a function to distribute the video data to the plurality of rendering units; and a timing server having a function to distribute to the plurality of rendering units, through a simultaneous broadcast communication, timing information to output synchronized video data from the plurality of rendering units to the corresponding display devices, the multi-screen video reproducing system outputting the synchronized video data to each of the plurality of display devices, the video distribution server including distributing video data to the plurality of rendering units. The timing server including distributing the timing information to the plurality of rendering units through a simultaneous broadcast communication at a predetermined timing after the distribution of the video data by the video distribution server. The plurality of rendering units including outputting the received video data to corresponding display devices on the basis of the timing information, when receiving the timing information distributed from the timing server after the reception of the video data distributed from the video distribution server.

According to the video generating method of the multi-screen video generating system, the multi-screen video generating system can obtain the same effect as the multi-screen video generating system according to (18).

Further, in the video generating method of the multi-screen video generating system of exemplary embodiments of the present invention, the multi-screen video generating system has preferably the same feature as the multi-screen video reproducing system according to (18). In addition, the multi-screen video generating system has preferably the same feature as the multi-screen video reproducing systems according to (3) to (14), (19) and (20).

(27) In the video reproducing method of the multi-screen video reproducing system according to (26), the multi-screen video reproducing system is preferably a multi-screen video reproducing system to output the synchronized video data to each of the plurality of display devices constituting a multi-screen display.

According to this exemplary embodiments of aspect of the present invention, it is possible to address or achieve the multi-screen video reproducing method which is suitable for the multi-screen video reproducing system of performing the video reproduction on the multi-screen display such as the tiling display.

(28) A video distribution server of exemplary embodiments of the present invention has a function to distribute video data to a plurality of rendering units and has a function to distribute the video data to the plurality of rendering units and a function to distribute to the plurality of rendering units, through a simultaneous broadcast communication, timing information to output synchronized video data from the plurality of rendering units to the corresponding display devices.

By using such a video distribution server, the video data and timing information are distributed to the plurality of rendering units. As a result, the synchronized video data can be output to the plurality of display devices and the synchronized reproduction of video can be made on the plurality of display devices.

(29) In the video distribution server according to (28), the video distribution server is preferably a video distribution server used in a multi-screen video reproducing system. The multi-screen video reproducing system includes a network; a plurality of rendering units connected to the network to output video data to a corresponding display device of a plurality of display devices; and a video distribution server which has a function to distribute the video data to the plurality of rendering units and a function to distribute to the plurality of rendering units, through a simultaneous broadcast communication, timing information to output synchronized video data from the plurality of rendering units to the corresponding display devices.

According to this exemplary aspect of the present invention, it is possible to constitute the multi-screen video reproducing system according to (1).

(30) A rendering unit of exemplary embodiments of the present invention has a function to output video data distributed from a video distribution server to a corresponding display device based on timing information distributed from the video distribution server.

By using such a rendering unit, the video data distributed from the video distribution server can be output to the corresponding display device based on timing information distributed from the video distribution server.

(31) In the rendering unit according to (30), the rendering unit is preferably a rendering unit used in a multi-screen video reproducing system. The multi-screen video reproducing system includes a network; a plurality of rendering units connected to the network to output video data to a corresponding display device of a plurality of display devices; and a video distribution server which has a function to distribute the video data to the plurality of rendering units and a function to distribute to the plurality of rendering units, through a simultaneous broadcast communication, timing information to output synchronized video data from the plurality of rendering units to the corresponding display devices.

According to this exemplary aspect of the present invention, it is possible to constitute the multi-screen video reproducing system according to (1).

(32) A rendering unit of exemplary embodiments of the present invention has a function to output video data distributed from a video distribution server to a corresponding display device based on timing information distributed from a timing server.

By using such a rendering unit, the video data distributed from a video distribution server can be output to a corresponding display device based on timing information distributed from a timing server.

(33) In the rendering unit according to (32), the rendering unit is preferably a rendering unit used in a multi-screen video reproducing system. The multi-screen video reproducing system includes a network; a plurality of rendering units connected to the network to output video data to a corresponding display device of a plurality of display devices; a video distribution server connected to the network to distribute the video data to the plurality of rendering units; and a timing server connected to the network to distribute to the plurality of rendering units, through a simultaneous broadcast communication, timing information to output synchronized video data from the plurality of rendering units to the corresponding display devices.

According to this exemplary aspect of the present invention, it is possible to constitute the multi-screen video reproducing system according to (18).

(34) A timing server of exemplary embodiments of the present invention has a function to distribute to a plurality of rendering units through a simultaneous broadcast communication, timing information to output synchronized video data from the plurality of rendering units to the corresponding display devices.

According to this exemplary aspect of the present invention, it is possible to constitute the multi-screen video reproducing system according to (1).

(35) In the timing server according to (34), the timing server is preferably a timing server used in a multi-screen video reproducing system. The multi-screen video reproducing system includes a network; a plurality of rendering units connected to the network to output video data to a corresponding display device of a plurality of display devices; a video distribution server connected to the network to distribute the video data to the plurality of rendering units; and a timing server connected to the network to distribute to the plurality of rendering units, through a simultaneous broadcast communication, timing information to output synchronized video data from the plurality of rendering units to the corresponding display devices.

According to this exemplary aspect of the present invention, it is possible to constitute the multi-screen video reproducing system according to (18).

(36) A display device of exemplary embodiments of the present invention includes a rendering unit having a function to output video data distributed from a video distribution server to a display section based on timing information distributed from the video distribution server.

As such, the display device has the function as the rendering unit so that it is not necessary to separately arrange the rendering unit. The video data from the video distribution server can be displayed on the display device. By using such a display device, when constituting the multi-screen video reproducing system according to (1), the system can be simplified.

(37) A display device of exemplary embodiments of the present invention includes a rendering unit having a function to output video data distributed from a video distribution server to a display section based on timing information distributed from a timing server.

In this case, similarly to (36), the video data from the video distribution server can be displayed on the display device without separately arranging the rendering unit. By using such a display device, when constituting the multi-screen video reproducing system according to (18), the system can be simplified.

DETAILED DESCRIPTION OF EMBODIMENTS

First Exemplary Embodiment

Figure 1:
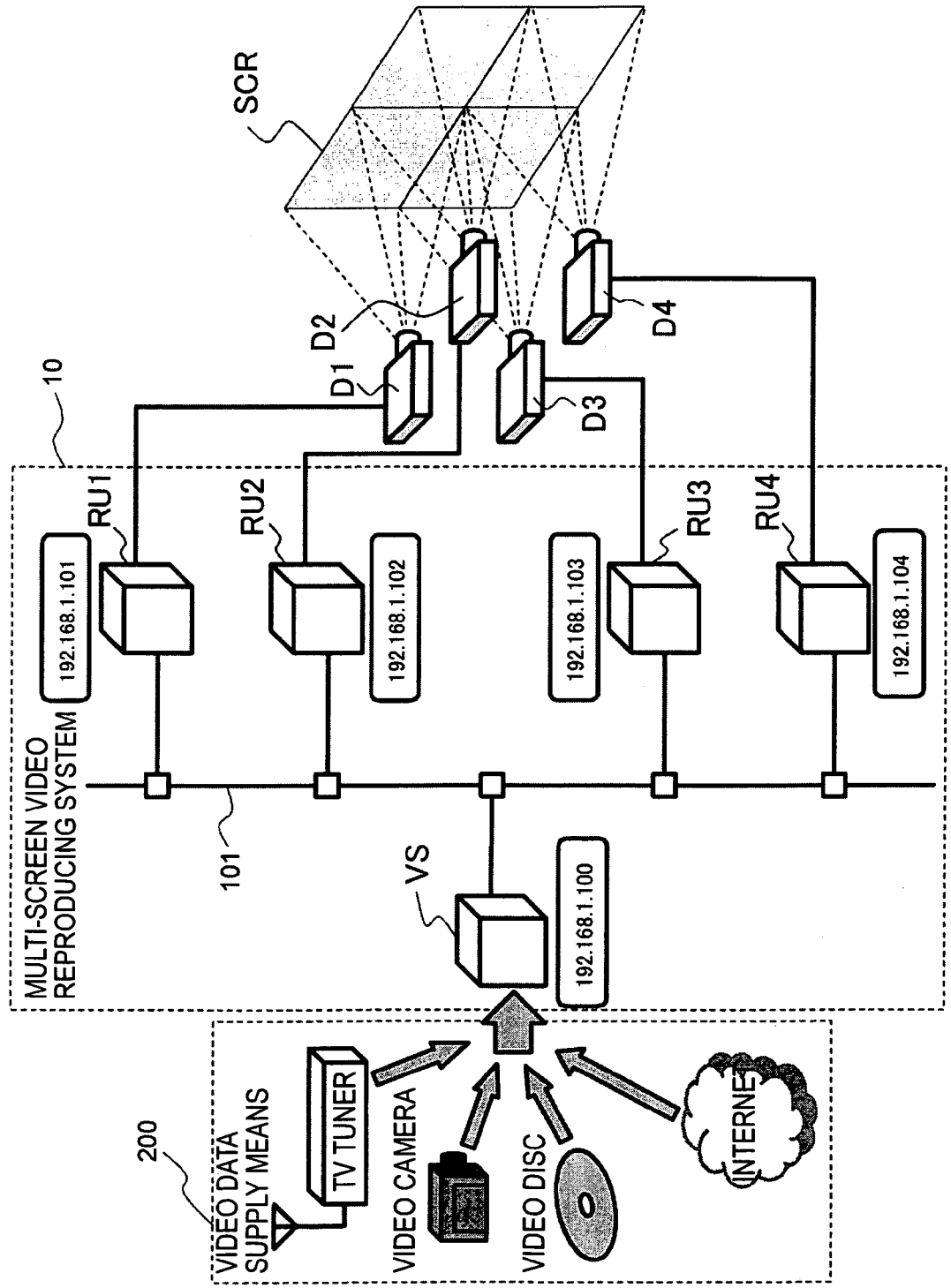
FIG. 1 is a schematic diagram for explaining a structure of a multi-screen video reproducing system according to a first exemplary embodiment of the present invention.

FIGS. 1 to 7 are diagrams for describing a multi-screen video reproducing system according to a first exemplary embodiment of the present invention. A multi-screen video reproducing system 10 according to the first exemplary embodiment is an image reproducing device to output video data synchronized with a plurality of display devices D1 to D4 (assuming that in the present exemplary embodiment, the display devices are (projectors) constituting a multi-screen display, as shown in FIG. 1.

The multi-screen display projecting the video data which is output by the multi-screen video reproducing system 10 and which is synchronized is composed of four display devices D1 to D4 arranged in a matrix of two rows and two columns (2×2). The multi-screen display integrates unit video (partial video) projected on a screen (SCR) by each of the display devices D1 to D4 to thus reproduce one large-screen video.

In addition, 'a frame' used for describing the first exemplary embodiment means 'a field' of an interlace type of video as well as 'a frame' of a general video. This is also applied to the other exemplary embodiments.

Figure 2:
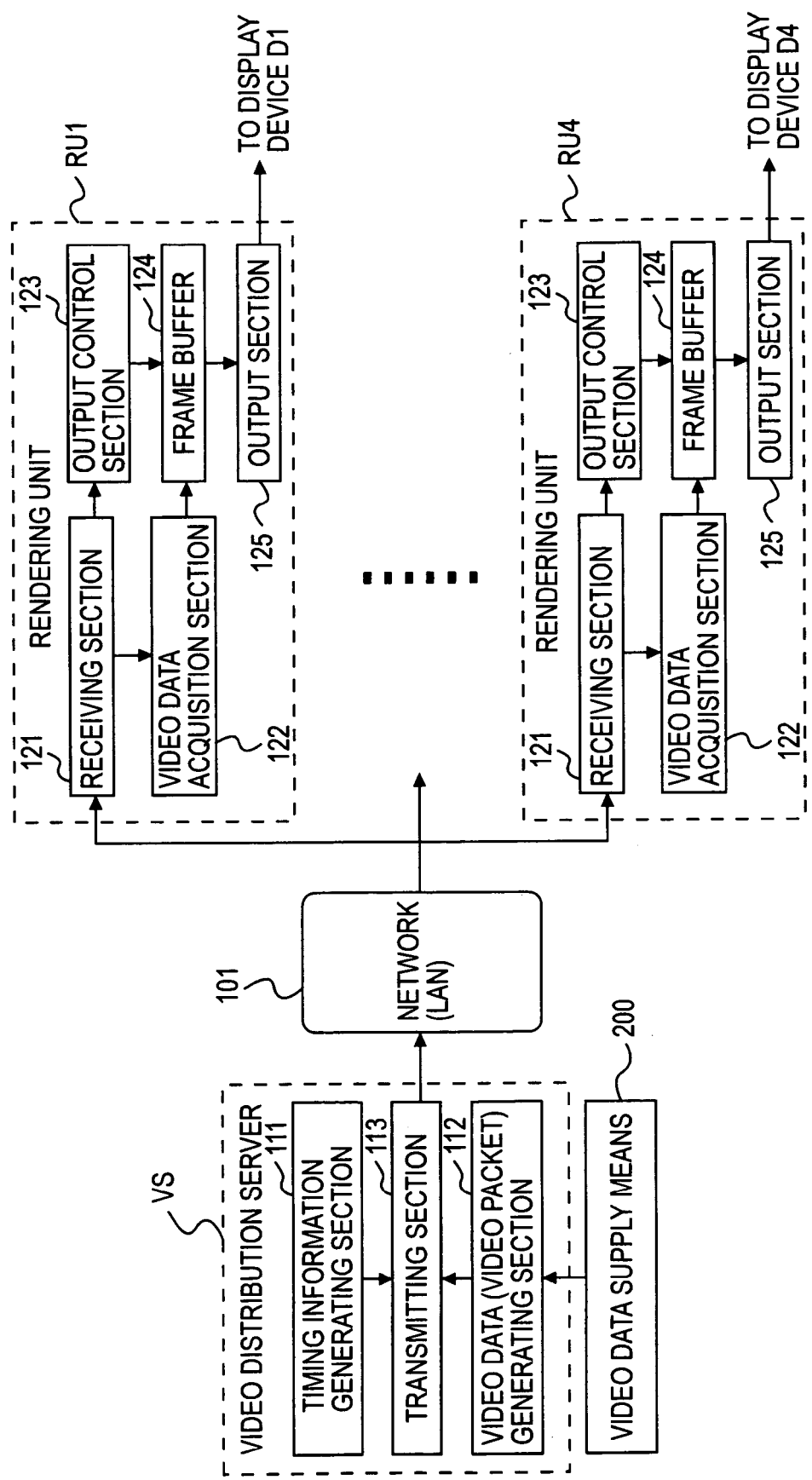
FIG. 2 is a schematic diagram for explaining structures of a video distribution server and a rendering unit of the multi-screen video reproducing system shown in FIG. 1.
Figure 3:
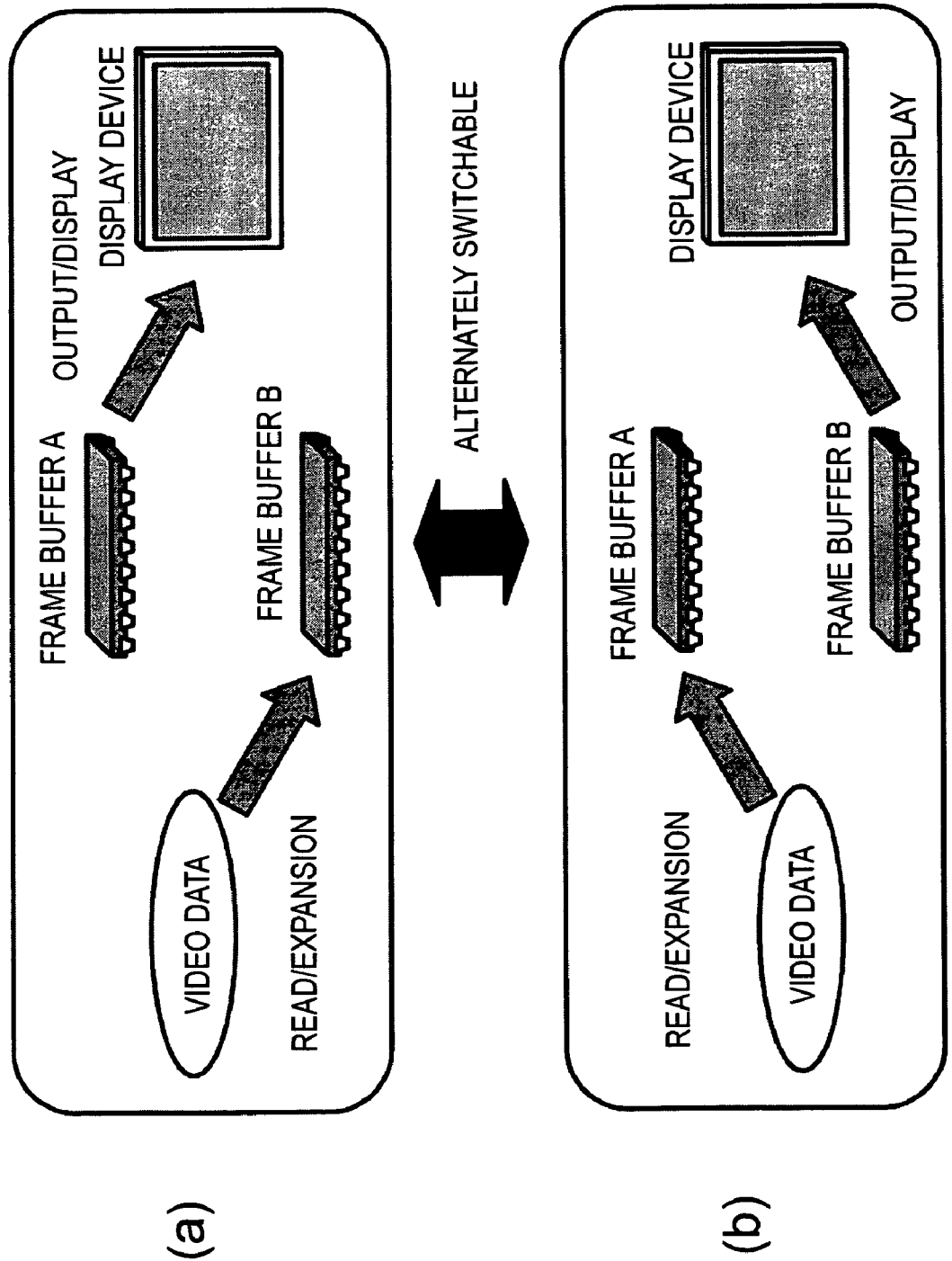
FIGS. 3(a)-(b) are diagrams for explaining double buffering.

FIGS. 1 to 2 are diagrams for describing a structure of the multi-screen video reproducing system 10 according to the first exemplary embodiment. As shown in FIGS. 1 to 2, the multi-screen video reproducing system 10 includes a LAN (Local Area Network) 101 functioning as a network, a video distribution server VS connected to the LAN 101 through a network interface (not shown) and a plurality of rendering units (RU1 to RU4) (four in the present exemplary embodiment) connected to the LAN 101 through the network interface (not shown). In addition, the video distribution server VS or the rendering units RU1 to RU4 can be prepared as a dedicated device or can be substituted by a personal computer (PC) having the network interface.

In addition, the video distribution server VS used for the multi-screen video reproducing system 10 has a function to convert digitized video data supplied from a video data supply device 200, such as, for example, a television tuner, a video camera, a video disc and an internet into packets to distribute the packet data to the rendering units RU1 to RU4 through a simultaneous broadcast communication such as a broadcast communication. In addition, the simultaneous broadcast communication can employ a multicast communication as well as the broadcast communication. However, the present exemplary embodiment uses the broadcast communication.

In addition, according to the first exemplary embodiment, the video distribution server VS has a timing information generating section 111 to generate timing information indicating a display instruction as a display indication packet, a video data generating section (also, called a video packet generating section) 112 to generate video data of a data size for each distribution unit as a video packet and a transmission section 113 to transmit onto the LAN 101 the display instruction packet generated by the timing information generating section 111 or the video packet generated by the video packet generating section 112.

In addition, the video distribution server VS has an IP address of '192.168.1.100' allocated on the LAN 101 and IP addresses are allocated to each of the rendering units RU1 to RU4 has on the LAN, as shown in FIG. 1.

In other words, the rendering unit RU1 has an IP address represented as '192.168.1.101' allocated on the LAN 101, the rendering unit RU2 has an IP address represented as '192.168.1.102' allocated on the LAN 101, the rendering unit RU3 has an IP address represented as '192.168.1.103' allocated on the LAN 101, and the rendering unit RU4 has an IP address represented as '192.168.1.104' allocated on the LAN 101. This means that all of video distribution server VS and rendering units RU1 to RU4 belong to a network group represented by '192.168.1'.

The video distribution server VS is connected to the rendering units RU1 to RU4 through the LAN 101. At this time, a network protocol is TCP/IP. In addition, the number of an IP version is 4, that is, the IP version is described as IPv4 in the present exemplary embodiment.

In addition, it is preferable that a network topology of the LAN 101 used in the present exemplary embodiment be a 'closed' network and be a connection type that there is not a much difference in the number of connecting layers between the video distribution server VS and the respective rendering units RU1 to RU4. This is because there is a possibility that the difference at the time of receiving the display instruction packets by the simultaneous broadcast communication (herein, the broadcast communication is used) increases between the rendering units RU1 to RU4 when there is a much difference in the number of connecting layers.

In addition, since the LAN 101 assumes a small and closed network, it may be not considered that the data flowing onto the LAN 101 in a packet type is delayed or lost.

In addition, each of the rendering units RU1 to RU4 has a receiving section 121 to receive the distributed information, a video data acquisition section 122 to acquire the video data stored in the video packets from the video distribution server VS received by the receiving section 121 to analyzes the acquired video data, an output control section 123 to perform output control on the basis of the display instruction packet from the video distribution server VS received by the receiving section 121, a frame butter 124 in which the video data stored in the video packets acquired by the video data acquisition section 122 is expanded, and an output section 125 to output the video data which should be displayed to a corresponding display device (any one of the display devices D1 to D4). The output sections 125 of the rendering units RU1 to RU4 are connected to the corresponding display devices (any one of the display devices D1 to D4), respectively.

In addition, each of the frame buffers 124 of the rendering units RU1 to RU4 is a storage region to expand the video data stored in the video packets which are transmitted from the video distribution server VS. A recording region is secured on a video memory of a video card when a RAM is arranged in a personal computer (PC).

In addition, the frame buffer 124 has two buffers consisting of a frame buffer (displaying frame buffer) to expand the video data currently displayed and a frame buffer (previously-reading frame buffer) to hold video data subsequently displayed and implements double buffering alternatively used as the previously-reading frame buffer and the displaying frame buffer. In addition, the previously reading frame buffer is not one, but may be plural.

FIGS. 3(a)-(b) are diagrams describing double buffering. As shown in FIGS. 3(a)-(b) as the frame buffer 124, two frame buffers A and B that constitutes the double buffering and have a mutually complementary relationship are used.

Operation of FIGS. 3(a)-(b) will be described with reference to the drawings. First, as shown in FIG. 3(a), the frame buffer A becomes a subject of output operation of the video data related to the corresponding frame expanded previously to the corresponding display device among the display devices D1 to D4. The frame buffer B becomes a subject of expansion operation of the video data related to a subsequent frame from the video distribution server VS.

Subsequently, as shown in FIG. 3(b), the frame buffer B becomes a subject of output operation of the video data related to the subsequent frame expanded previously to the corresponding display device among the display devices D1 to D4, and the frame buffer A becomes a subject of expansion operation of the video data related to further subsequent frame distributed from the video distribution server VS.

In addition, the frame buffer 124 may be one composed of the plurality of frame buffers which has a mutually complementary relationship, as described above. For example, the frame buffer 124 may also be one that is configured to have a function as a ring buffer. In addition, the 'expansion' of the video data into the frame buffer 124 means that the compressed or enciphered video data is decompressed or decoded to be stored into the frame buffer 124, in addition to the video data storing into the frame buffer 124 as it is.

Next, operation of the first exemplary embodiment will be described.

First, the video data, which should be displayed on any one of the display devices, is input to the video distribution server VS from the video data supply means 200. After that, the video distribution server VS converts the input video data into packets to generate the video packets through the video packet generating section 112, and transmits the video packets on the LAN 101 from the transmission section 113 through the broadcast communication so as to be transmitted toward each of the rendering units RU1 to RU4. At this time, an IP address used for the broadcast communication is '192.168.1.255'.

In addition, in an Ethernet (registered trademark) which is a network standard used generally, since an upper limit of an information amount per one packet (MTU: Maximum Transmission Unit) is defined to 1500 bytes by excluding a header information portion, the information of the video data required to expand one frame may be not stored in one video packet. Therefore, the distribution of the video packet is performed for a plurality of times until the video data required to be expanded into each of the frame buffers 124 of the rendering units RU1 to RU4 are arranged at the sides of the rendering units RU1 to RU4.

As described above, when the video packet is transmitted from the transmission section 113 of the video distribution server VS onto the LAN 101 through the broadcast communication, each of the rendering units RU1 to RU4 receives the distributed video packet. Thereby, the rendering units RU1 to RU4 can receive the same video data through the receiving sections 121, respectively.

As such, when each of the rendering units RU1 to RU4 receives the video packet by the receiving section 121, the received video packet is buffered by the video data acquisition section 122. In addition, after the packet analysis is performed to acquire information necessary for the video data process, such as a detection of the compressed format, the video data stored in the video packet is expanded in the frame buffer 124.

Figure 17:
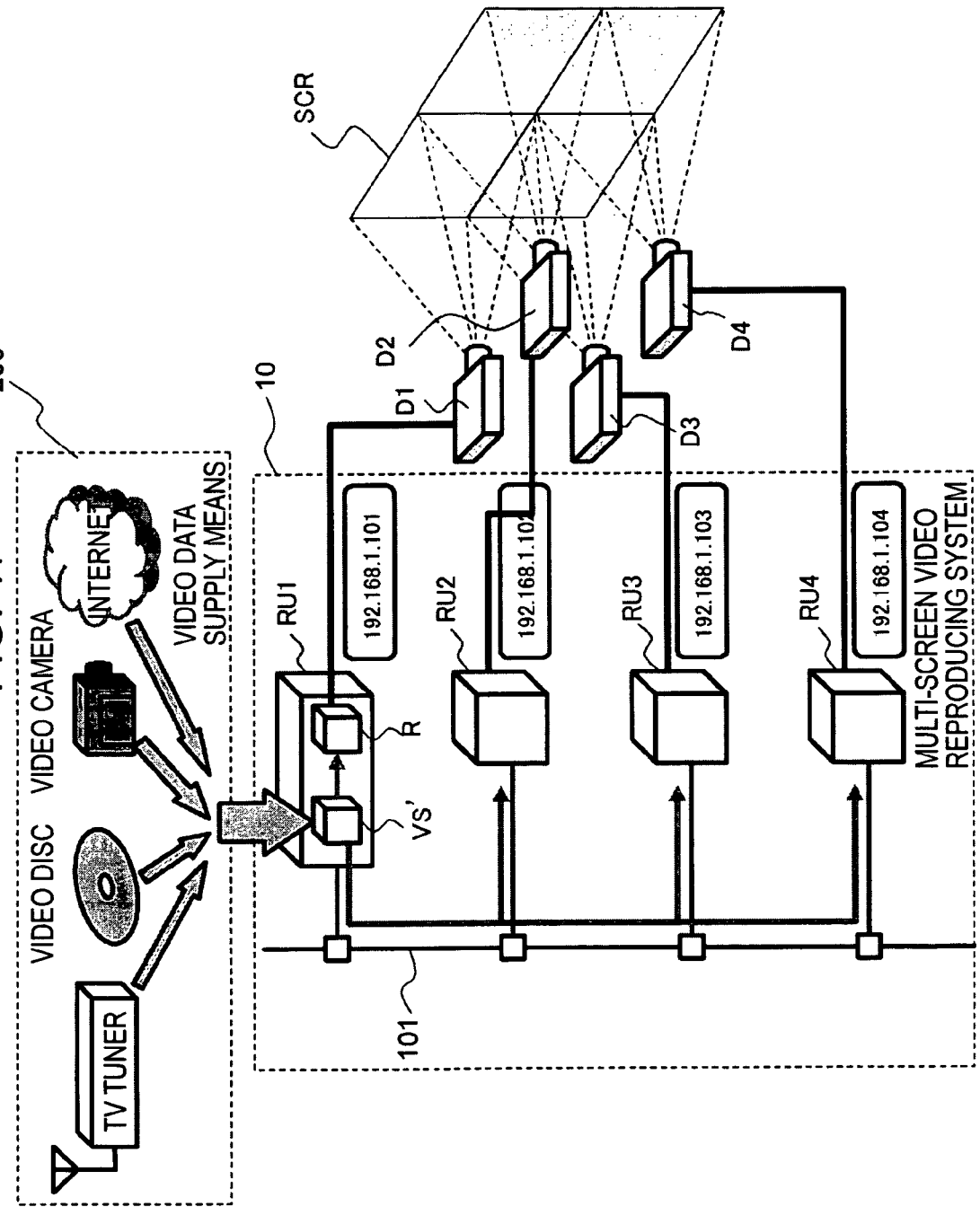
FIG. 17 is a schematic diagram for explaining a structure of a multi-screen video reproducing system according to a fourth exemplary embodiment of the present invention.

Here, in the case of a tiling display, as shown in FIG. 17, constituting one large screen obtained by integrating the partial video displayed by each of the four display devices D1 to D4 of 2×2 constituting the multi-screen display, each of the rendering units RU1 to RU4 expands the video data corresponding to only a display region (for example, in the rendering unit RU1 connected to the display device D1, the upper left region of an integrated screen of 2×2) allocated to itself from the video data stored in the received video packet into the frame buffer 124 in a magnified manner. In addition, the respective rendering units RU1 to RU4 may output the same video data so that the same video may be displayed on the corresponding display devices D1 to D4, respectively.

Subsequently, the video distribution server VS generates the display instruction packet by the timing information generating section 111 at the timing of a display period T (when a frame rate is 30 frame/sec, it is about 33.333 ms) matching the frame-updated period of the video data and distributes the generated display instruction packet to the rendering units RU1 to RU4 through the broadcast communication.

As such, according to the first exemplary embodiment, the video distribution server VS has a function as the timing server to distribute the display instruction packet serving as the synchronization signal according to the display instruction timing to the respective rendering units RU1 to RU4, in addition to the function for distributing the video.

When receiving the display instruction packet from the video distribution server VS by the receiving section 121, each of the rendering units RU1 to RU4 transmits the received display instruction packet to the output control section 123. The output control section 123 performs the output control of the video data which should be displayed with respect to the frame buffer 124 based on the display instruction packet from the video distribution server VS. Thereby, each of the rendering units RU1 to RU4 reads the video data from the frame buffer 124 at the same timing, and the read video data is output to the corresponding display devices D1 to D4, respectively.

In addition, as described above, in the case of the tiling display constituting one large screen obtained by integrating the partial video displayed by each of the four display devices D1 to D4 of 2×2 constituting the multi-screen display, each of the rendering units RU1 to RU4 outputs in a synchronous state to the corresponding display devices D1 to D4 the video data corresponding to only the display region (for example, in the rendering unit connected to the display device D1, the upper left region of an integrated screen of 2×2) allocated to itself from the received video data.

Thereby, the respective synchronous partial video are projected on the plurality of display devices D1 to D4 constituting the multi-screen display and one large screen obtained by integrating the partial video is displayed on the screen SCR.

However, since each of rendering units RU1 to RU4 may expand the video data which should be subsequently displayed into the frame buffer 124 (displaying frame buffer) until the rendering units RU1 to RU4 receives the display instruction packets from the video distribution server VS, when the relationship between a maximum time TL required for each of the rendering units RU1 to RU4 to receive and expand the video data and the display period T satisfies TL≦T, a performance difference process speed difference) between the rendering units RU1 to RU4 can be diminished to some extent.

Figure 4:
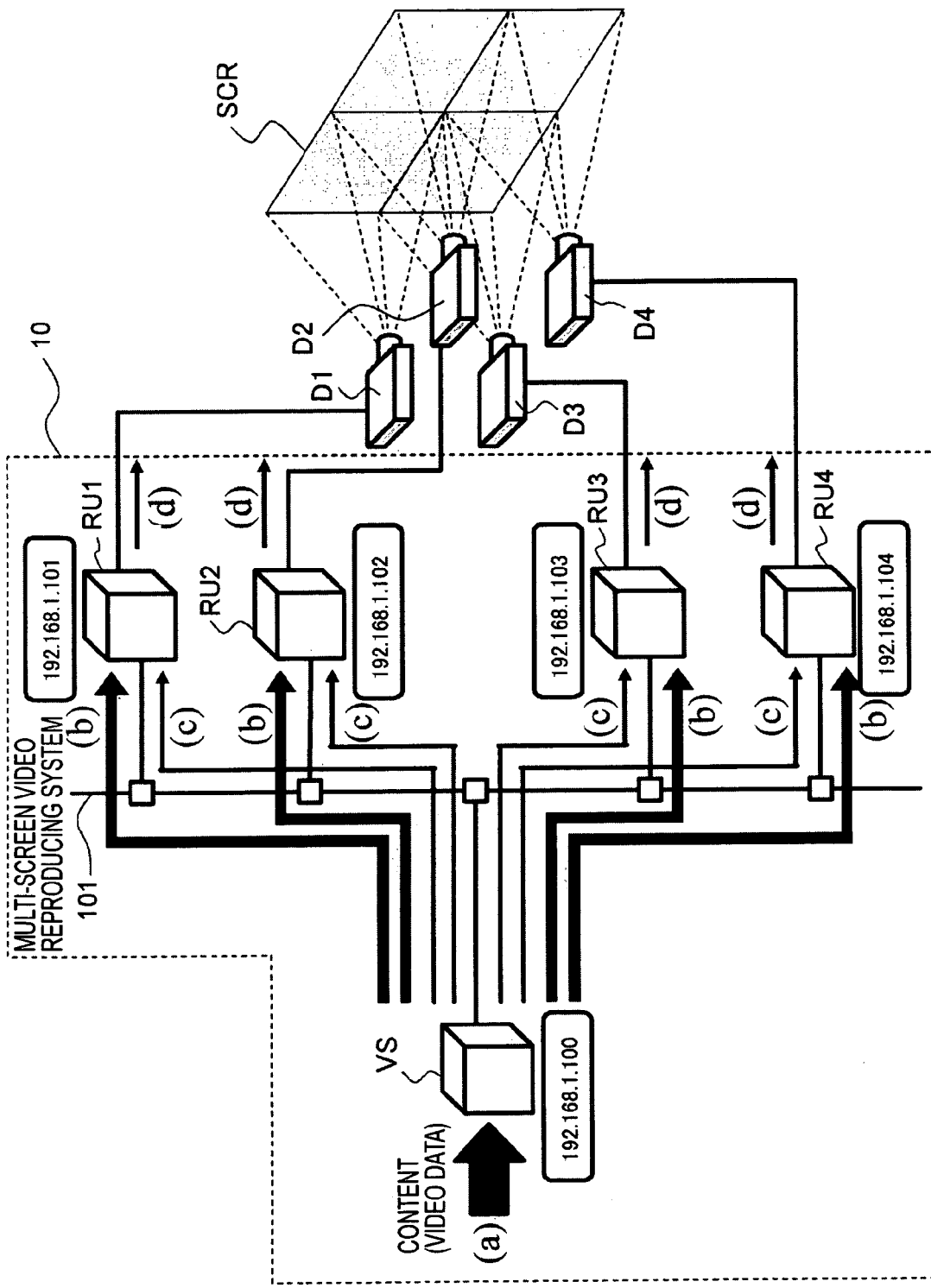
FIG. 4 is a schematic diagram for explaining a flow of an overall process of the multi-screen video reproducing system according to the first exemplary embodiment of the present invention, on the basis of the structure of FIG. 1.
Figure 5:
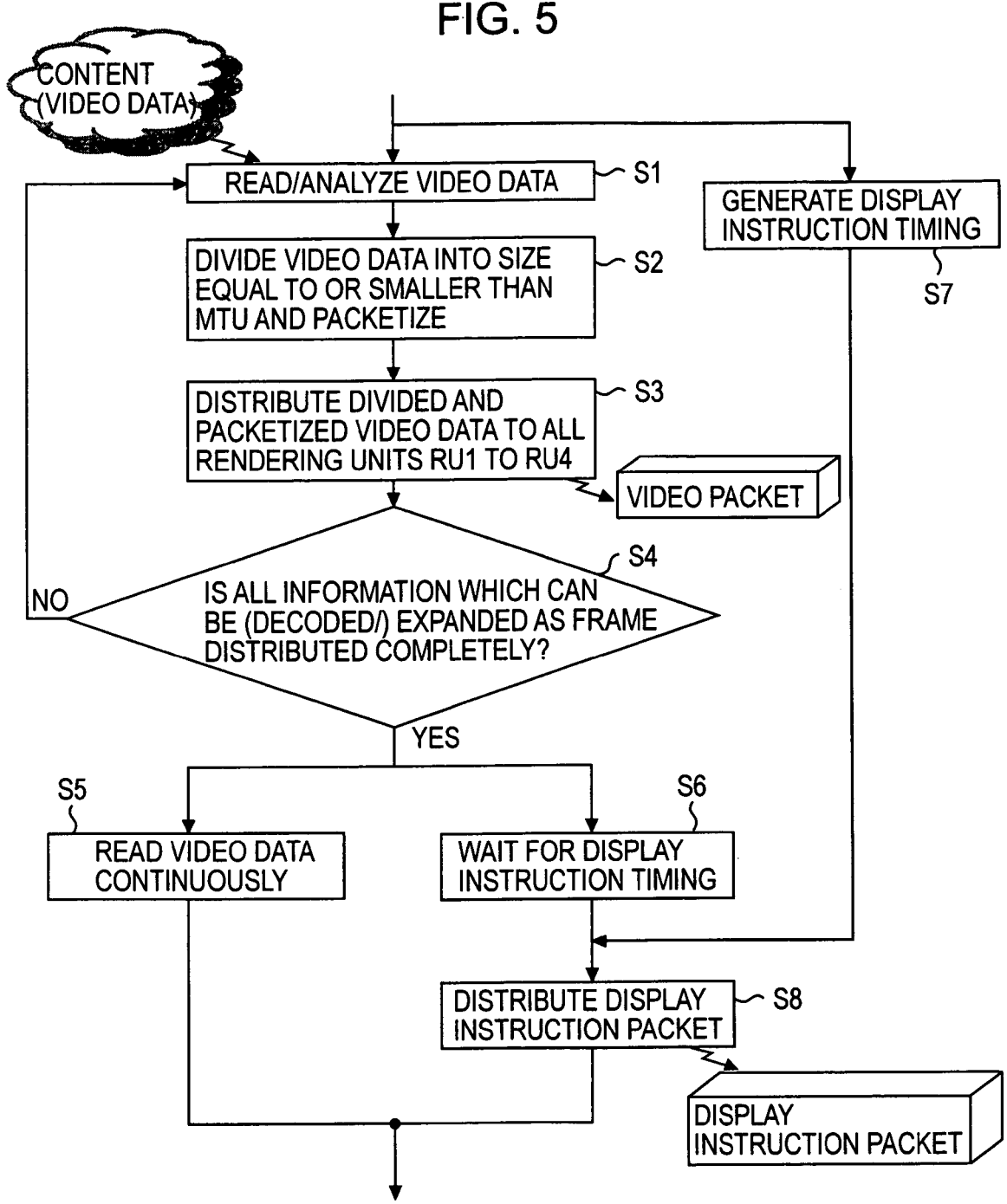
FIG. 5 is a flowchart for explaining a flow of a process of the video distribution server in the multi-screen video reproducing system according to the first exemplary embodiment of the present invention.

FIG. 4 is a schematic diagram for describing a flow of process of the video distribution server according to the first exemplary embodiment on the basis of the structure of FIG. 1 and FIG. 5 is a flowchart of the same. Since the process performed by the video distribution server VS is all described, only the overall flow of process is briefly described herein.

First, content (video data) from the video data supply device 200 is read and analyzed ((a) of FIG. 4 and step S1 of FIG. 5), the read and analyzed video data is converted into packets by dividing the video data into a data size equal to or smaller than the above-mentioned MTU (step S2 of FIG. 5), and the packetized video data (video packet) is distributed to all rendering units RU1 to RU4 through the broadcast communication ((b) of FIG. 4 and step S3 of FIG. 5).

Next, it is determined whether all information which can be expanded as the frame (also, including the decoding process, if necessary) is distributed completely (step S4 of FIG. 5), the process returns to the step S1 and the processes subsequent to the step S1 are performed when the distribution is not completed, and the video data is continuously read and it is entered in a display instructing timing waiting state when the distribution is completed (steps S5 and S6 of FIG. 5). Next, when becoming the timing which should update the display (step S7 of FIG. 5), the display instruction packets are distributed to the all rendering units RU1 to RU4 ((c) of FIG. 4 and step S8 of FIG. 5).

When the display instruction packets are distributed to the all rendering units RU1 to RU4, each of the rendering units RU1 to RU4 outputs to the corresponding display devices D1 to D4 the video data already expanded in the frame buffer 124 ((d) of FIG. 4).

Figure 6:
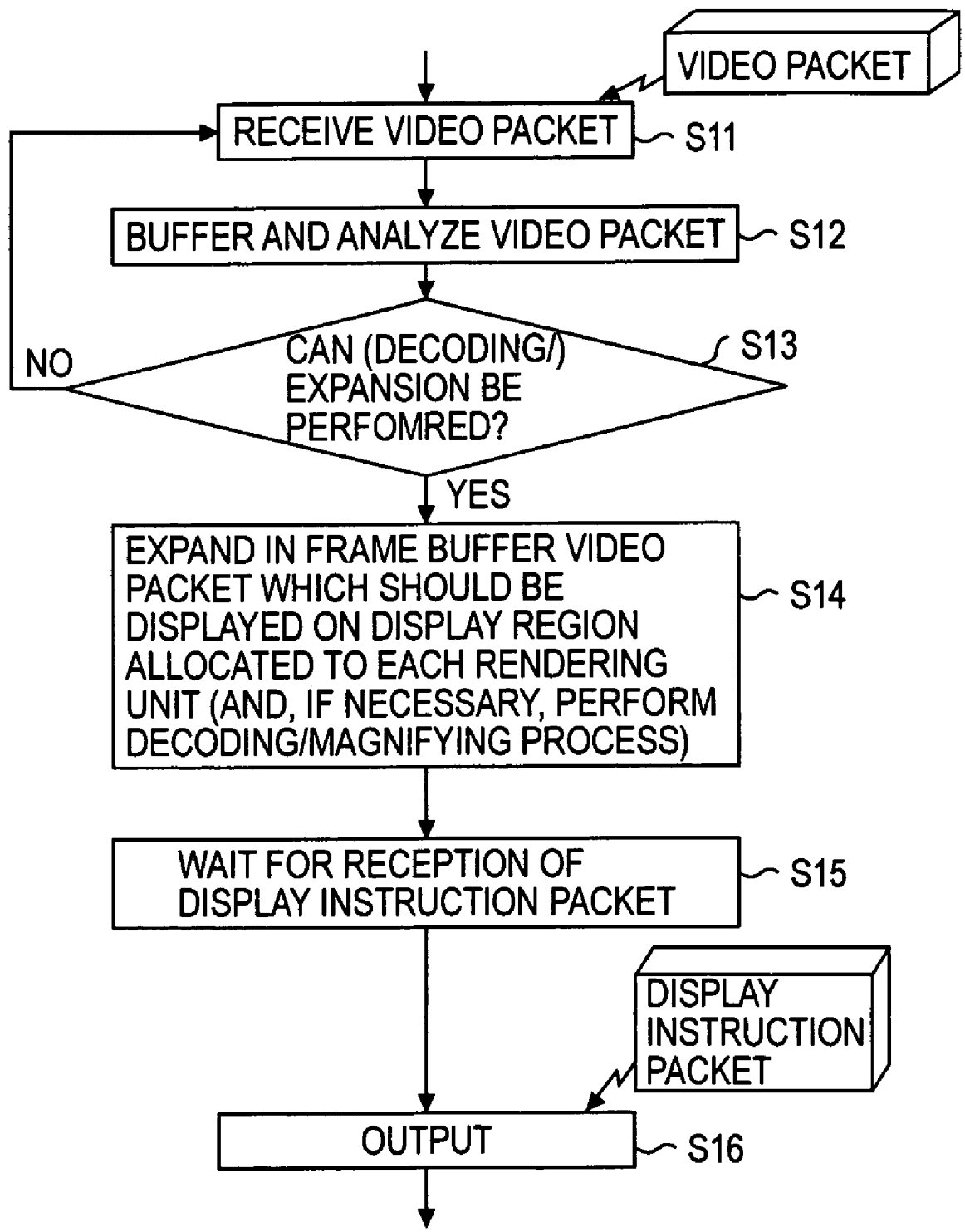
FIG. 6 is a flowchart for explaining a flow of a process of the rendering unit in the multi-screen video reproducing system according to the first exemplary embodiment of the present invention.

FIG. 6 is a flowchart for describing the flow of process of the rendering units RU1 to RU4 according to the first exemplary embodiment. Since the process performed by each of the rendering units RU1 to RU4 is already described, only the overall flow of the process is briefly described in FIG. 6. First, when receiving the video packet (step S11), the video data acquisition section 122 buffers the acquired video packet and performs packet analysis to acquire information necessary for a process of the video data such as the detection of the compressed format (step S12), determines whether the video packet can be expanded or not (also, including the decoding process, if necessary) (step S13), and expands in the frame buffer 124 the video data which should be displayed on the display section allocated to each of rendering units (step S14) when the video data can be expanded. Next, in the step S14, a decoding process or magnifying process is performed.

Next, it is entered in a reception waiting state of the display instruction packet from the video distribution server VS (step S15). When receiving the display instruction packet from the video distribution server VS, by the output control section 123, the video data expanded in the frame buffer 124 is output to the corresponding display device through the output section 125. The video data expanded in the frame buffer 124 is output from the respective rendering units RU1 to RU4 to the corresponding display devices D1 to D4 such that in the case of the rendering unit RU1, the video data is output to the display device D1, and in the rendering unit RU2, the video data is output to the rendering unit RU2, for example (step S16).

Figure 7:
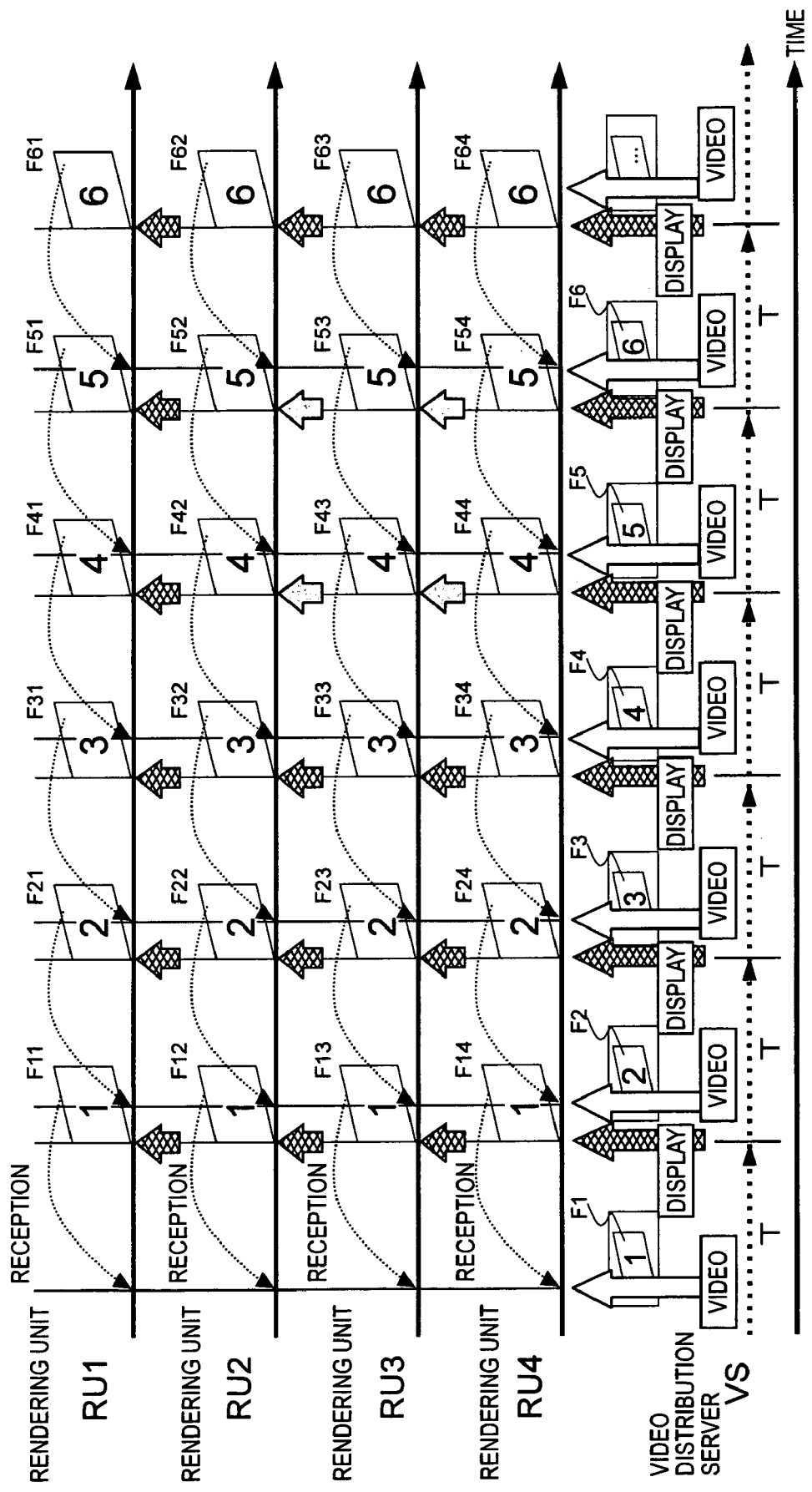
FIG. 7 is a schematic diagram for explaining operation of the multi-screen video reproducing system according to the first exemplary embodiment of the present invention.

FIG. 7 is a diagram to describe operation of the multi-screen video reproducing system according to the first exemplary embodiment of the present invention. FIG. 7 shows a distribution timing of the video packet and display instruction packet from the video distribution server VS to the rendering units RU1 to RU4 and the operations of the rendering units RU1 to RU4 according to the distribution timing.

In the multi-screen video reproducing system 10 according to the first exemplary embodiment, the video distribution server VS distributes the display instruction packet at a predetermined timing after distributing the video packet. In FIG. 7, the distribution timing of the video packet is indicated by a blank arrow and the distribution timing of the display instruction packet is indicated by a gray arrow. In addition, the 'video' described at the portion of the blank arrow is one represented by simplifying the 'video packet' and the blank arrow shows the distribution timing of the video packet. In addition, the 'display' described at the portion of the gray arrow is one represented by simplifying the 'display instruction packet' and the gray arrow shows the distribution timing of the display instruction packet.

In addition, as described above, exemplary embodiments of the present invention are not limited to a manner that the video of one frame should be transmitted as one packet. However, the drawing related to the present exemplary embodiment shows that one frame is transmitted as one packet, for convenience. This is also applied to FIGS. 11 and 16 used for describing the subsequent second and third exemplary embodiments.

As apprehended from FIG. 7, the video distribution server VS distributes the video packet of the frame F1 to each of the rendering units RU1 to RU4 and each of the rendering units RU1 to RU4 expands into the frame buffer 124 the video data of the frame F1 stored in the video packet. Subsequently, the video distribution server VS distributes the display instruction packet to each of the rendering units RU1 to RU4 at a predetermined timing so that each of the rendering units RU1 to RU4 output to the corresponding display devices D1 to D4 the video data of the frame F1 expanded in the frame buffer 124.

Subsequently, the video distribution server VS distributes the video packet of the frame F2 to each of the rendering units RU1 to RU4 and each of the rendering units RU1 to RU4 expands into the frame buffer 124 the video data of the frame F2 stored in the video packet. Subsequently, the video distribution server VS distributes the display instruction packet to each of the rendering units RU1 to RU4 at a predetermined timing so that each of the rendering units RU1 to RU4 output to the corresponding display devices D1 to D4 the video data of the frame F2 expanded in the frame buffer 124.

By repeating this operation, each of the rendering units RU1 to RU4 can output the synchronous video data to each of the display devices D1 to D4.

In addition, FIG. 7 shows an example of display operation in a tiling display composed of the four display devices D1 to D4 as shown in FIG. 1. Here, F1, F2, . . . indicate the video data of the frames with respect to the overall tiling display, respectively, F11, F12, . . . indicate the video data of the first frame, the second frame, . . . corresponding to a region allocated to the rendering unit RU1, respectively, F21, F22, . . . indicate the video data of the first frame, the second frame, corresponding to a region allocated to the rendering unit RU2, respectively, F31, F32, . . . indicate the video data of the first frame corresponding to a region allocated to the rendering unit RU3, the video data of the second frame corresponding to the region allocated to the rendering unit RU3, . . . , respectively, and F41, F42, . . . indicate the video data of the first frame corresponding to a region allocated to the rendering unit RU4, the video data of the second frame corresponding to the region allocated to the rendering unit RU4, . . . , respectively.

As apprehended from the above-mentioned description in the multi-screen video reproducing system 10 according to the first exemplary embodiment, the same video packets are distributed from the video distribution server VS to each of the rendering units RU1 to RU4 through the simultaneous broadcasting communication. In addition, the rendering units RU1 to RU4 expand into the frame buffer 124 the video data stored in the distributed video packet (in the case of the tiling display, each of the rendering unit performs a process of cutting or magnifying a specific part of the frame so as to become the video data corresponding to a display region allocated to itself). After that, the video data expanded in the frame buffer 124 is respectively output to the corresponding display devices D1 to D4, based on the display instruction packet distributed from the video distribution server VS through the simultaneous broadcasting communication.

In this manner, in the multi-screen video reproducing system 10 according to the first exemplary embodiment, the rendering units RU1 to RU4 output the video data to the respective corresponding display devices D1 to D4, based on the display instruction packet distributed simultaneously from the video distribution server VS to the respective rendering units RU1 to RU4 through the LAN 101. As a result, it is not necessary for any one of the video distribution server VS functioning as the distribution side and the respective rendering units RU1 to RU4 functioning as the receiving side to recognize an absolute time.

For this reason, it is not necessary for any one of the video distribution server VS functioning as the distribution side and the respective rendering units RU1 to RU4 functioning as the receiving side to have a much accurate clock built therein or receive a time signal distributed from a GPS satellite or communicate with an external time server based on NTP. Therefore, according to the present exemplary embodiment, it is possible to reproduce the synchronized video using a simple system which can be handled easily and be low-priced.

Second Exemplary Embodiment

According to the above-mentioned first exemplary embodiment, the same video data is simultaneously distributed from the video distribution server VS to all rendering units RU1 to RU4 through the broadcast communication (or the multicast communication), however, according to the second exemplary embodiment, the video data which should be displayed on the display devices by the respective rendering units RU1 to RU4 is individually distributed to each of the rendering units RU1 to RU4.

In other words, in the case of the tiling display, as shown in FIG. 17, constituting one large screen obtained by integrating the partial videos displayed by each of the four display devices D1 to D4 of 2×2 constituting the multi-screen display, since each of the rendering units RU1 to RU4 outputs to the respective corresponding display devices D1 to D4 the partial video corresponding to a display region allocated to itself, the partial video data corresponding to the display region allocated to each of the rendering units RU1 to RU4 is individually distributed to each of the rendering units RU1 to RU4.

An overall structure to address or achieve the second exemplary embodiment is the same as FIG. 1 and structures of a video distribution server VS and rendering units RU1 to RU4 is the same as FIG. 2. The second exemplary embodiment of the present invention will be described with reference to FIGS. 8 to 11.

Figure 8:
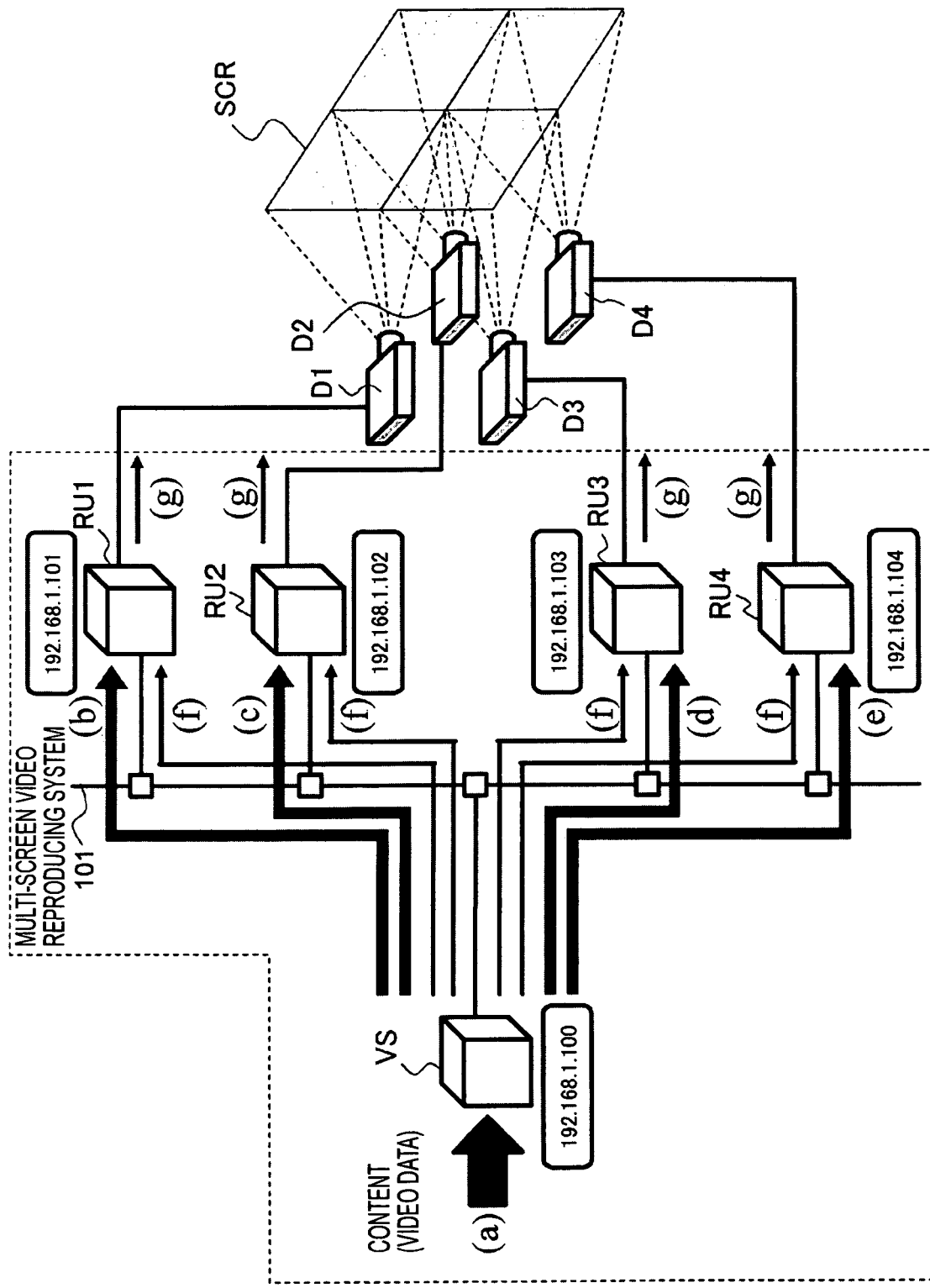
FIG. 8 is a schematic diagram for explaining a flow of an overall process of a multi-screen video reproducing system according to a second exemplary embodiment of the present invention, on the basis of the structure of FIG. 1.
Figure 9:
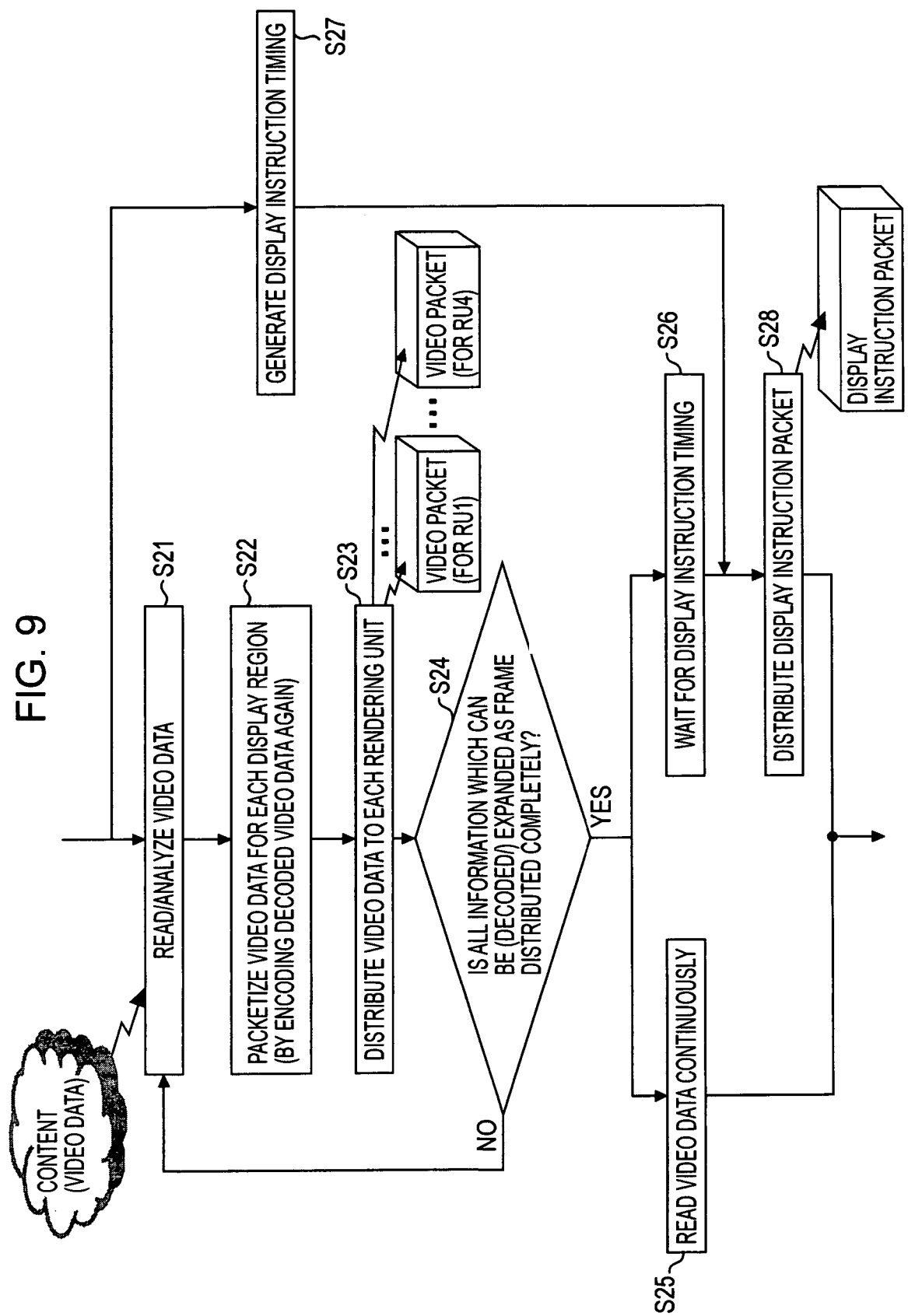
FIG. 9 is a flowchart for explaining a flow of a process of a video distribution server in the multi-screen video reproducing system according to the second exemplary embodiment of the present invention.

FIG. 8 is a diagram for describing a flow of process of the video distribution server VS side according to the second exemplary embodiment on the basis of the structure of FIG. 1 and FIG. 9 is a flowchart of the same. Since the process performed by the video distribution server VS is already described in the first exemplary embodiment, only the flow of process according to the second exemplary embodiment will be briefly described.

First, contents (video data) from the video data supply device 200 is read and analyzed ((a) of FIG. 8 and step S21 of FIG. 9), the read and analyzed video data is converted into packets for each display region allocated to each of the rendering units RU1 to RU4 (step S22). At this time, there is also a case in which decoding and encoding process are performed such that the read and analyzed video data is decoded, the decoded data is divided for each display region allocated to each of the rendering units RU1 to RU4, and the divided video data for each display region is again encoded to be converted into packets.

Subsequently, the video data packetized for each display region is distributed to the respective corresponding rendering units RU1 to RU4 ((b) to (e) of FIG. 8 and the step S23 of FIG. 9).

Next, it is determined whether all information, which can be expanded as the frame (also, including the decoding process, if necessary) is distributed completely (step S24 of FIG. 9), the process returns to the step S1 and the processes subsequent to the step S1 are performed when the distribution is not completed, and the video data is continuously read out and it is entered in a display instructing timing waiting state when the distribution is completed (steps S25 and S26 of FIG. 9).

Next, when it is the display instruction timing (step S27 of FIG. 9), the display instruction packets are produced and the produced display instruction packets are distributed to all rendering units RU1 to RU4 through the broadcast communication (or through multicast communication) ((f) of FIG. 8 and step S28 of FIG. 9). When the display instruction packets are distributed to all of the rendering units RU1 to RU4, each of the rendering units RU1 to RU4 outputs the video data corresponding to the display region allocated to each of the rendering units ((g) of FIG. 8).

In this manner, according to the second exemplary embodiment, the distribution of the video packet to each of the rendering units RU1 to RU4 is performed such that the video data corresponding to the display region allocated to each of the rendering units RU1 to RU4 is converted into packets and the packetized data is distributed to the respective rendering units RU1 to RU4. For this reason, the video packets are distributed to the respective rendering units RU1 to RU4 through a communication (unicast communication). In addition, the display instruction packets are distributed to the respective rendering units RU1 to RU4 through a broadcast communication (also, through multicast communication).

Figure 10:
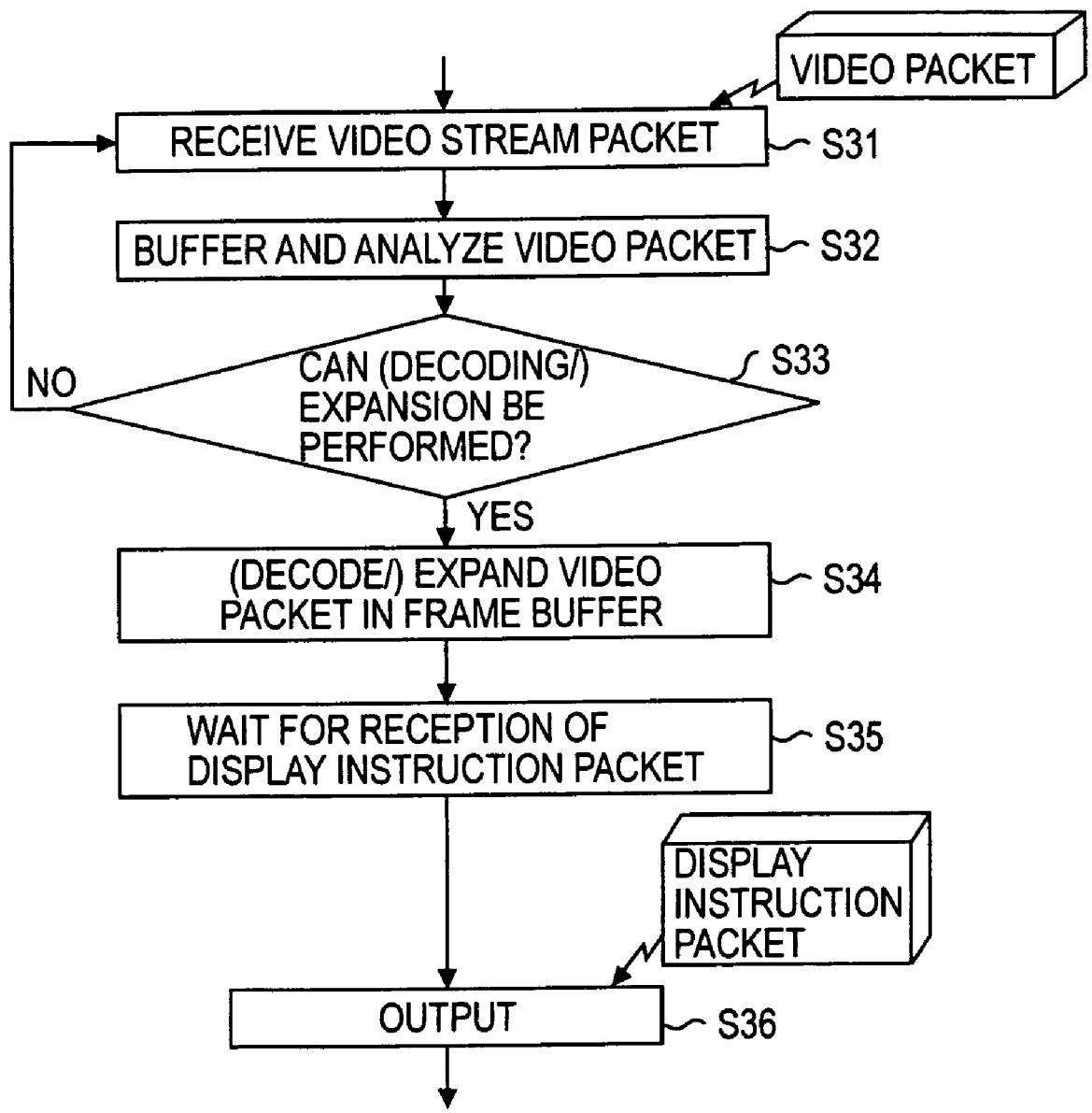
FIG. 10 is a flowchart for explaining a flow of a process of a rendering unit in the multi-screen video reproducing system according to the second exemplary embodiment of the present invention.

FIG. 10 is a flowchart for describing a flow of process of the rendering units RU1 to RU4 and is substantially the same as FIG. 6 used in the above-mentioned first exemplary embodiment. Steps S31 to S36 of FIG. 10 correspond to the steps S11 to S16 of FIG. 6, but only the step S34 of FIG. 10 is different from the step S14 of FIG. 6. In other words, according to the second exemplary embodiment, since the video data corresponding to the display region allocated to each of the rendering units RU1 to RU4 is distributed to the respective rendering units RU1 to RU4, the video data may be expanded in the frame buffer 124 (there is a case in which the decoding process is performed). Since the other details of FIG. 10 are the same as FIG. 6, the overall description is omitted.

Figure 11:
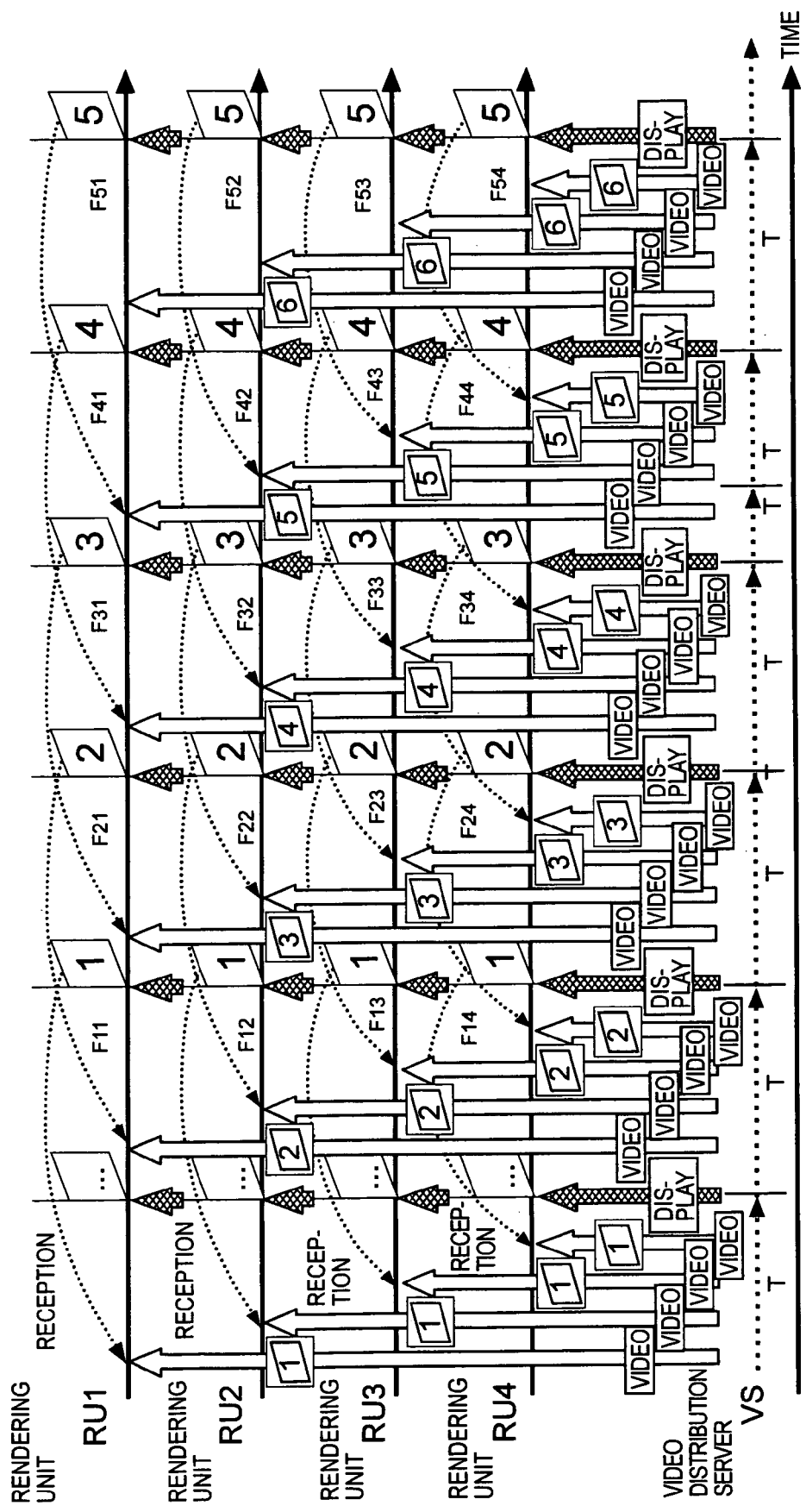
FIG. 11 is a schematic diagram for explaining operation of the multi-screen video reproducing system according to the second exemplary embodiment of the present invention.

FIG. 11 is a schematic diagram for describing operation of the multi-screen video reproducing system according to the second exemplary embodiment of the present invention. FIG. 11 shows a distribution timing of the video packet and display instruction packet from the video distribution server VS to the rendering units RU1 to RU4 and the operations of the rendering units RU1 to RU4 according to the distribution timing.

In FIG. 11, the distribution timing of the video packet is indicated by a blank arrow and the distribution timing of the display instruction packet is indicated by a gray arrow, similarly to FIG. 7 used for describing the first exemplary embodiment. In addition, the 'video' described at the portion of the blank arrow is one represented by simplifying the 'video packet' and the blank arrow shows the distribution timing of the video packet. In addition, the 'display' described at the portion of the gray arrow is one represented by simplifying the 'display instruction packet' and the gray arrow shows the distribution timing of the display instruction packet.

According to the second exemplary embodiment, as described above, since the video packet into which the video data corresponding to the display region allocated to each of the rendering units RU1 to RU4 is stored is distributed from the video distribution server VS to each of the rendering units RU1 to RU4, the different video data is converted into packets and the packetized video data is sequentially distributed to each of the rendering units RU1 to RU4. As a result, each of the rendering units RU1 to RU4 expands its frame buffer 124 the video data stored in the video packet distributed to each of the rendering units RU1 to RU2.

Subsequently, the video distribution server VS distributes the display instruction packet to the respective rendering units RU1 to RU4 at a predetermined timing through the broadcast communication so that the respective rendering units RU1 to RU4 output to the corresponding display devices D1 to D4 the video data of the frame F1 expanded in the frame buffer 124. In this case, as described above, exemplary embodiments of the present invention is not limited to a manner that the video of one frame should be transmitted as one packet. However, FIG. 11 shows that one frame is transmitted as one packet, for convenience.

By repeating this operation, each of the rendering units RU1 to RU4 can output the synchronous video data to each of the display devices D1 to D4.

Third Exemplary Embodiment

The third exemplary embodiment of the present invention has a structure that the function as the timing server is removed from the video distribution server VS described in the first and second exemplary embodiments. In other words, according to the first and second exemplary embodiments, the video distribution server VS has the function as the timing server. However, according to the third exemplary embodiment, the timing server is provided to be separated from the video distribution server VS. In addition, in the description of the second exemplary embodiment, it is not described clearly that the video distribution server VS serves as the timing server. However, in the case of the second exemplary embodiment, since the structure of the multi-screen video reproducing system 10 is the same as that of the first exemplary embodiment, the video distribution server VS has the function as the timing server.

Figure 12:
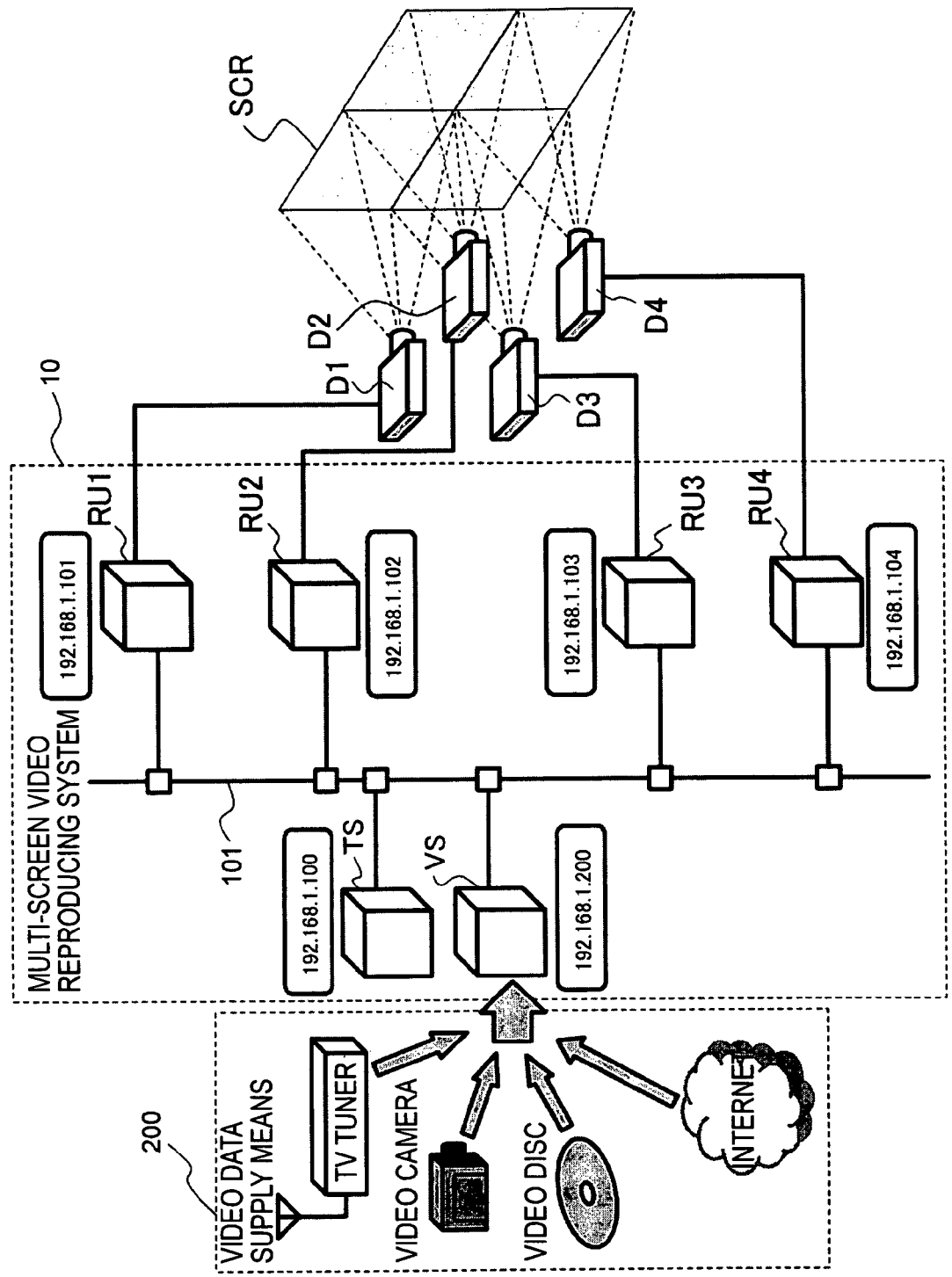
FIG. 12 is a schematic diagram for explaining a structure of a multi-screen video reproducing system according to a third exemplary embodiment of the present invention.

FIG. 12 is a schematic diagram to describe a structure of a multi-screen video reproducing system 10 according to the third exemplary embodiment of the present invention. The structure of FIG. 12 is the same as that of FIG. 1, except that a timing server TS is provided to be separated from the video distribution server VS and the same constituent elements are denoted by the same reference numerals. In addition, the timing server TS has a network interface (not shown), similarly to the video distribution server VS or the rendering units RU1 to RU4 and is connected to a network (LAN 101) through the network interface.

Figure 13:
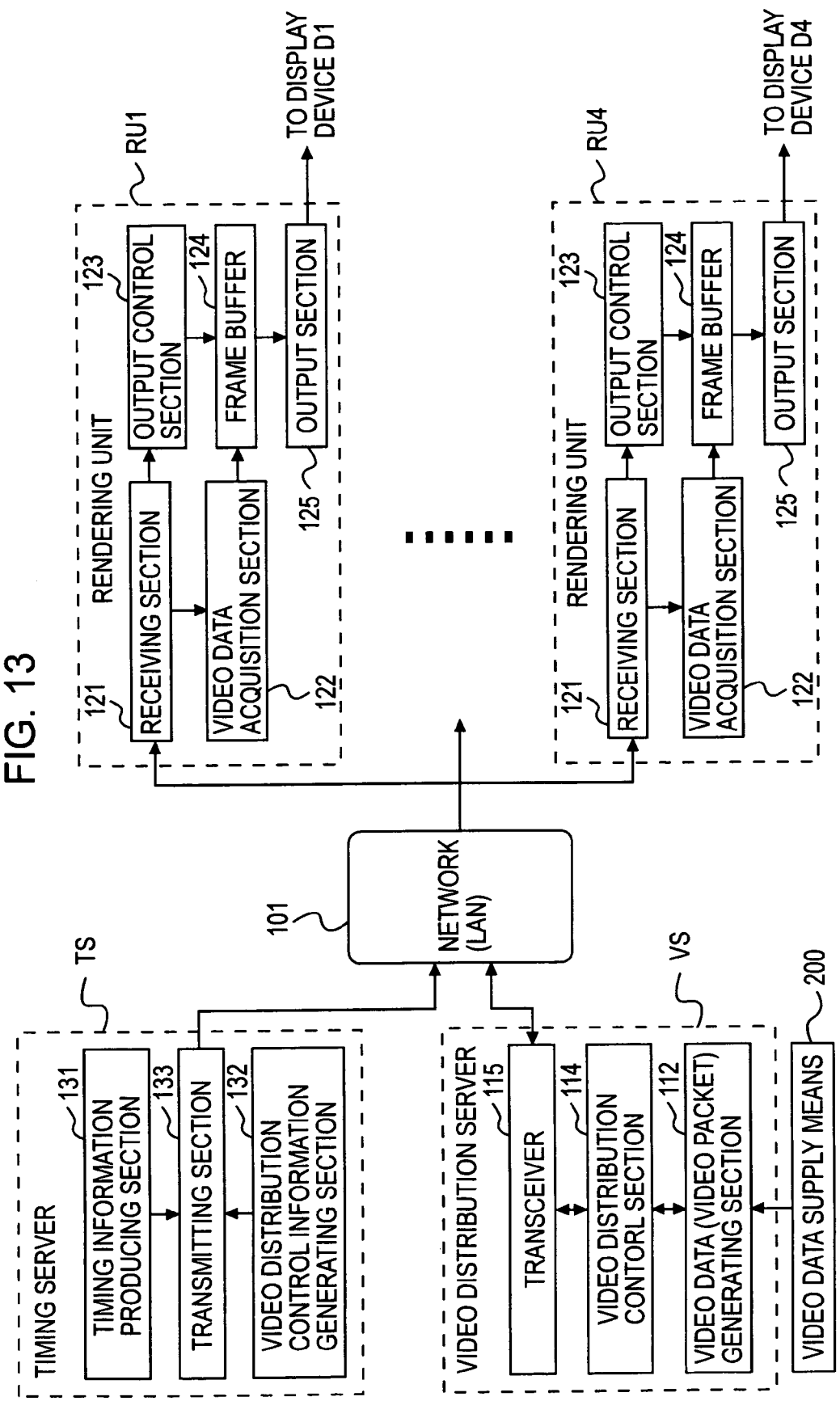
FIG. 13 is a schematic diagram for explaining structures of a video distribution server and a rendering unit of the multi-screen video reproducing system shown in FIG. 12.

FIG. 13 is a schematic diagram to describe the structures of the video distribution server VS and the timing server TS in FIG. 12. In addition, the structures of the rendering units RU1 to RU4 are the same as those of FIG. 2.

As apprehended from FIGS. 12 and 13, according to the third exemplary embodiment, a multi-screen video reproducing system includes the timing server TS in addition to the video distribution server VS. The timing server TS has a timing information generating section 131 to generate the display instruction timing information to synchronize the display between the rendering units RU1 to RU4, a video distribution control information generating section 132 when the video distribution server VS performs the video distribution to the rendering units RU1 to RU4, and a transmission section 133 to distribute the display instruction timing information.

On the other hand, the video distribution server VS has the video packet generating section 112, similarly to the video distribution server VS shown in FIG. 2. In addition, according to the third exemplary embodiment, the video distribution server VS has a video distribution control section 114 to perform the video distribution control to the rendering units RU1 to RU4, based on the video distribution control information produced by the video distribution control information generating section 132 of the timing server TS and a transceiver 115 having a function as a transmission section to transmit the video packet onto the network (LAN 101) and a function as a receiving section to receive the video distribution control information produced by the timing server TS.

The operation of the multi-screen video reproducing system according to the third exemplary embodiment having the video distribution server VS and the timing server TS will be described.

Figure 14:
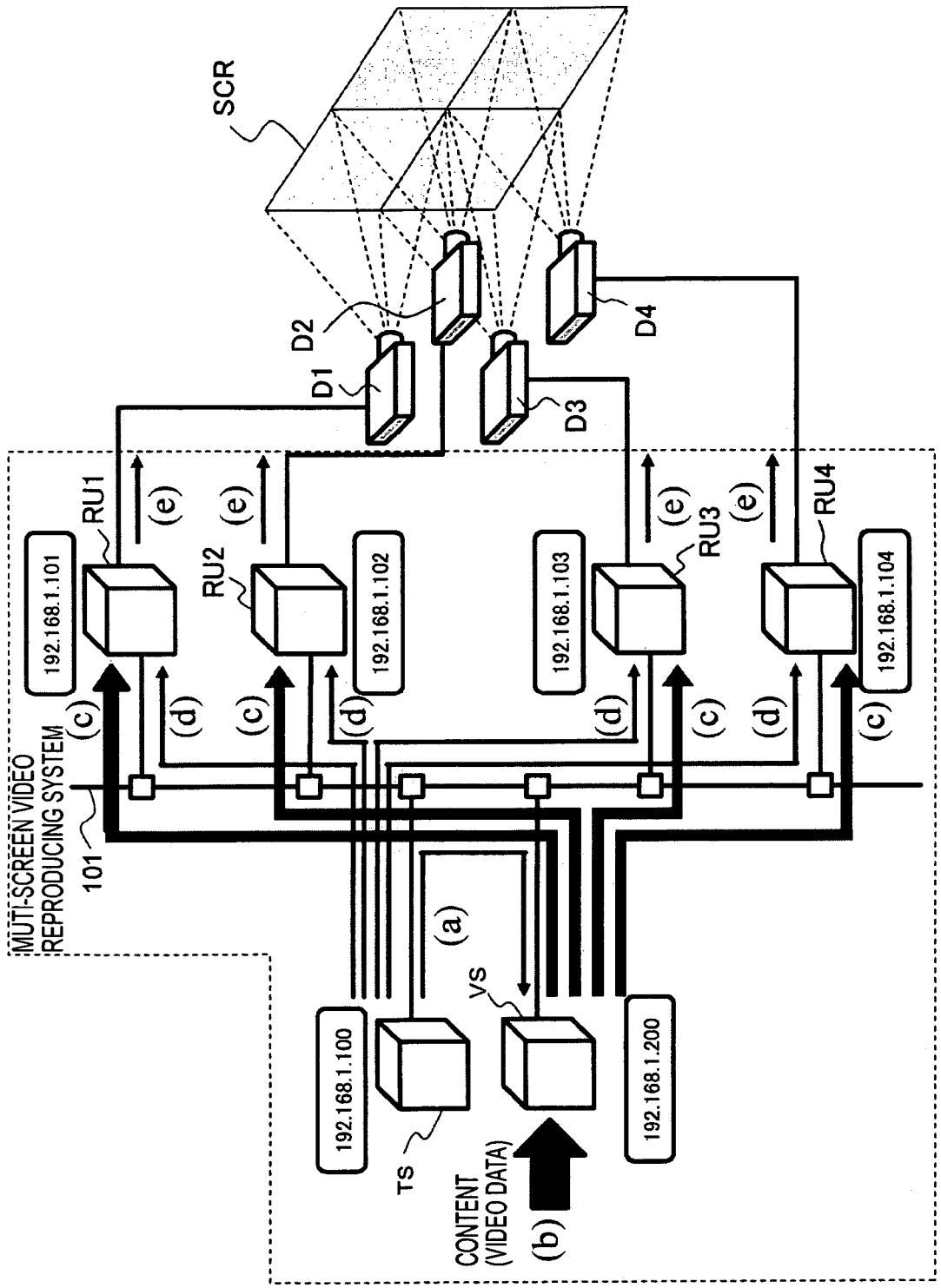
FIG. 14 is a schematic diagram for explaining a flow of an overall process of the multi-screen video reproducing system according to the third exemplary embodiment of the present invention, on the basis of the structure of FIG. 12.
Figure 15:
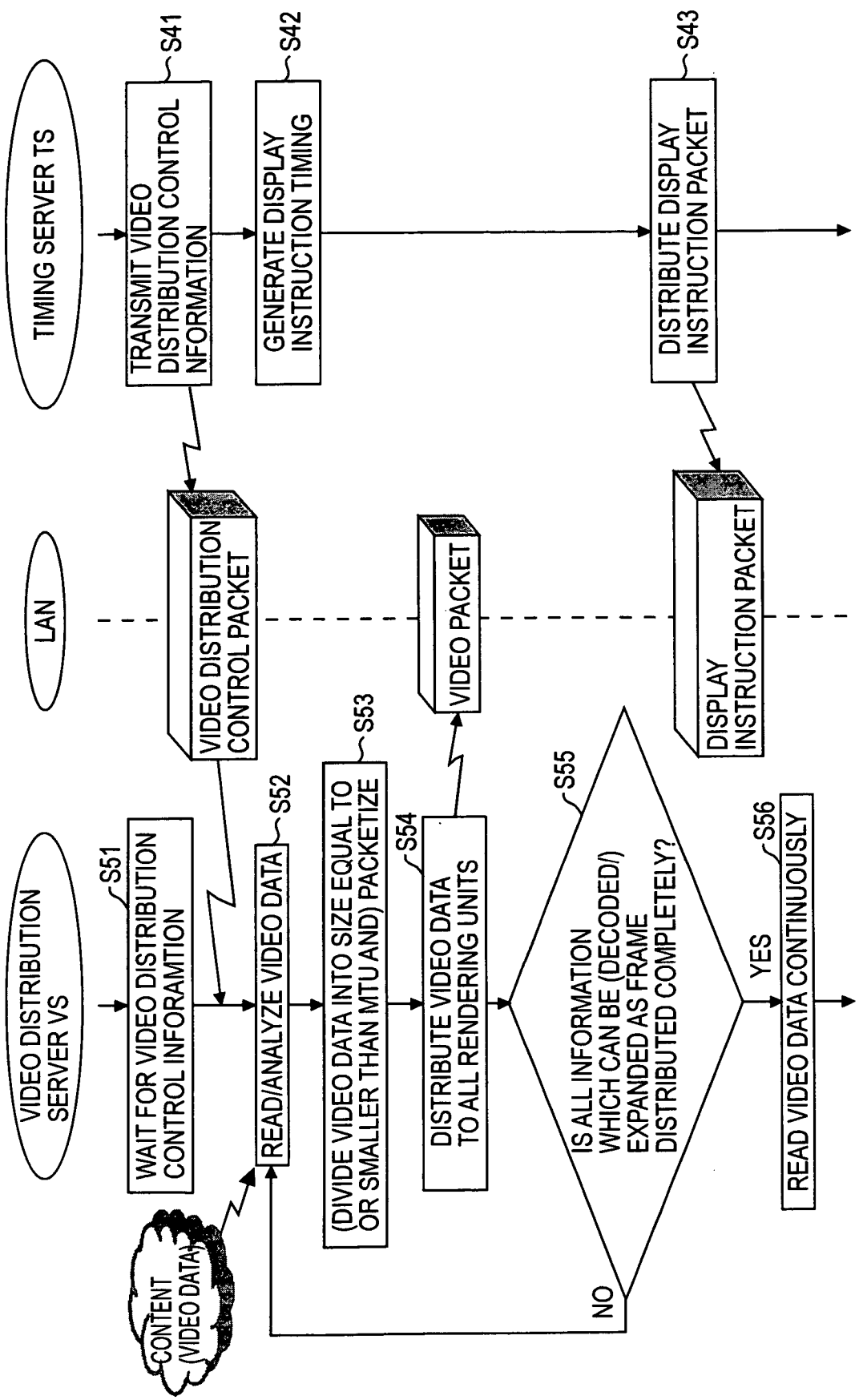
FIG. 15 is a flowchart for explaining a flow of processes of the video distribution server and a timing server in the multi-screen video reproducing system according to the third exemplary embodiment of the present invention.

FIG. 14 is a schematic diagram to describe a flow of process of the video distribution server VS and the timing server TS according to the third exemplary embodiment on the basis of the structure of FIG. 12 and FIG. 15 is a flowchart of the same.

First, the timing server TS distributes the video distribution server VS the video distribution control information in the form of the packet ((a) of FIG. 14 and the step S41 of FIG. 15). Thereby, from the video distribution control information waiting state (step S51), the video distribution server VS reads and analyzes contents (video data) ((b) of FIG. 14 and step S52 of FIG. 15), divides the read and analyzed video data into the data size smaller than the above-mentioned MTU and then converts them into packets (step S53 of FIG. 15), and distributes the packetized video data (video packet) to the rendering units RU1 to RU4 through the broadcast communication ((c) of FIG. 14 and the step S54 of FIG. 15).

Next, it is determined whether the distribution of all information, which can be expanded as the frame (also, including the decoding process, if necessary), is completed (step S55 of FIG. 15), the process returns to the step S52 and the processes subsequent to the step S52 are performed when the distribution is not completed, and the video data is continuously read out when the distribution is completed (steps S56 of FIG. 15).

On the other hand, after the distribution of the video distribution control information (step S41 of FIG. 15), the timing server TS generates the display instruction timing (step S42 of FIG. 15) and distributes the display instruction packet according to the generated display instruction timing (step S43 of FIG. 15).

The process is repeated. In addition, each of the rendering units RU1 to RU4 has the same operation as the flow of process shown in the flowchart of FIG. 6 used for describing the first exemplary embodiment.

As such, according to the third exemplary embodiment, the timing server TS is provided to be separated from the timing server TS, and the timing server TS distributes to the video distribution server VS the video distribution control packet to perform the video distribution control and distributes to each of the rendering units RU1 to RU4 the display instruction packet to synchronize the display at the proper timing.

Figure 16:
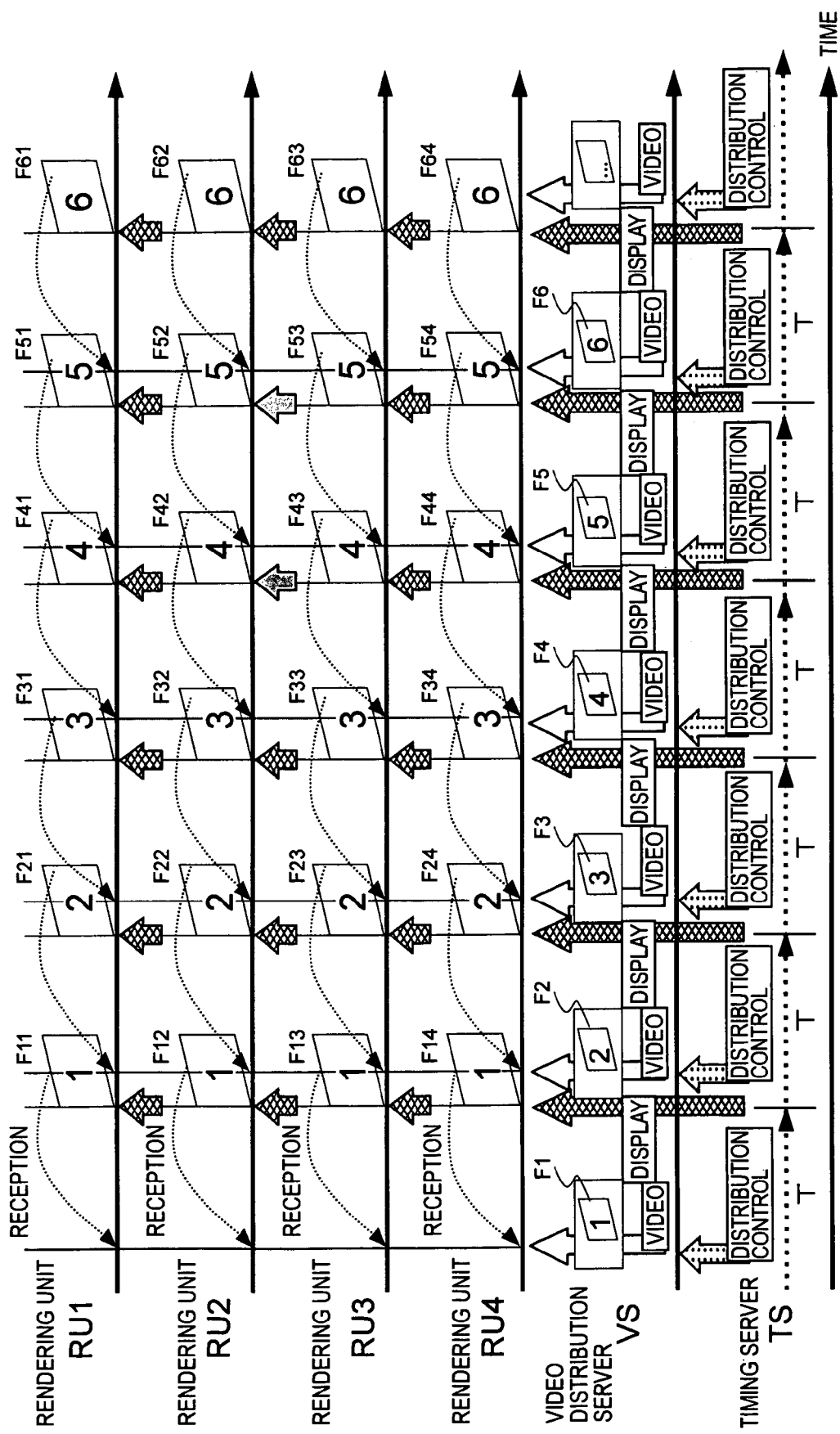
FIG. 16 is a schematic diagram for explaining operation of the multi-screen video reproducing system according to the third exemplary embodiment of the present invention.

FIG. 16 is a schematic diagram for describing the operation of the multi-screen video reproducing system according to the third exemplary embodiment of the present invention. FIG. 16 shows the distribution timing of the video distribution control packet from the timing server TS to the video distribution server VS, the distribution timing of the video packet from the video distribution server VS to each of the rendering units RU1 to RU4, the distribution timing of the display instruction packet from the timing server TS to each of the rendering units RU1 to RU4 and the operation of each of the rendering units RU1 to RU4 based on the video packet from the video distribution server and the display instruction packet from the timing server TS.

In FIG. 16, the distribution timing of the video distribution control packet of the timing server TS to the video distribution server VS is indicated by a hatched arrow, the distribution timing of the video packet of the video distribution server VS to each of the rendering units RU1 to RU4 is indicated by a blank arrow, and the distribution timing of the display instruction packet of the timing server TS to each of the rendering units RU1 to RU4 is indicated by a gray arrow.

In addition, in FIG. 16, the 'video' described at the portion of the blank arrow is one represented by simplifying the 'video packet' and the blank arrow shows the distribution timing of the video packet. In addition, the 'display' described at the portion of the gray arrow is one represented by simplifying the 'display instruction packet' and the gray arrow shows the distribution timing of the display instruction packet. In addition, the 'distribution control' described at the portion of the hatched arrow is one represented by simplifying the 'video distribution control packet' and the hatched arrow shows the distribution timing of the video distribution control packet, similarly to the above-mentioned first and second exemplary embodiments.

The operation of FIG. 16 is substantially the same as that of FIG. 7 used for describing the first exemplary embodiment. In other words, the operation of FIG. 16 is the same as that of FIG. 7, except that the processes subsequent to step S52 shown in FIG. 15 are performed based on the distribution timing (indicated by the hatched arrow) of the video distribution control packet from the timing server TS to the video distribution server VS so that the video packet is distributed from the video distribution server VS to each of the rendering units RU1 to RU4, and the display instruction packet (indicated by the gray arrow) is output from the timing server TS to each of the rendering units RU1 to RU4. Therefore, the description of the operation will be omitted.

As described above, according to the third exemplary embodiment, the timing server TS is provided to be separated from the video distribution server VS and the video distribution control packet is distributed to the video distribution server VS by the timing server VS so that the video distribution control of the video distribution server VS is performed. In addition, the display instruction packet to synchronize the display between the rendering units RU1 to RU4 is distributed to each of the rendering units RU1 to RU4 at the predetermined timing through the simultaneous broadcast communication (broadcast communication or the like).

As such, the timing server TS assumes a part of the functions of the video distribution server VS according to the first or second exemplary embodiment so that the load of process of the video distribution server VS can be alleviated. In addition, any one of the rendering units RU1 to RU4 can function as the timing server TS and the degree of freedom can be enhanced in structure.

In addition, in the above-mentioned description, the example applied to the first exemplary embodiment is described, but the third exemplary embodiment may be applied to the second exemplary embodiment.

Fourth Exemplary Embodiment

A fourth exemplary embodiment relates to a structure that in the multi-screen video reproducing system 10 according to the above-mentioned exemplary embodiments, any one of the rendering units RU1 to RU4 serves as any one of the video distribution server VS and the timing server TS or both video distribution server VS and timing server TS.

As such, for example, the structure that any one of the rendering units RU1 to RU4 serves as any one of the video distribution server VS and the timing server TS or both the video distribution server VS and the timing server TS is one that when the video distribution server VS has the function of the timing server TS as in the multi-screen video reproducing systems according to the first and second exemplary embodiments, any one of the rendering units RU1 to RU4 has the function of the video distribution server VS.

In addition, as in the multi-screen video reproducing system 10 according to the third exemplary embodiment, when the timing server TS is provided to be separated from the video distribution server VS, one rendering unit of the plurality of rendering units RU1 to RU4 may have the function of any one of the video distribution server VS and the timing server TS or both functions of the video distribution server VS and the timing server TS, and each of the video distribution server VS and the timing server TS may has an independent rendering unit such that the one rendering unit has the function of the video distribution server VS and another rendering unit has the function of the timing server.

A fourth exemplary embodiment is described by taking the multi-screen video reproducing system according to the first or second exemplary embodiment. In other words, a case in which one rendering unit of the plurality of rendering units RU1 to RU4 includes the video distribution server VS having the function of the timing server TS is described. In addition, according to the fourth exemplary embodiment, the video distribution server VS is included in the rendering unit RU1.

FIG. 17 is a schematic diagram for describing the structure of the multi-screen video reproducing system 10 according to the fourth exemplary embodiment of the present invention. The structure of FIG. 17 is the same as that of FIG. 1, except that the rendering unit RU1 has the function as the video distribution server VS. The same constituent elements are denoted by the same reference numerals. In addition, in the fourth exemplary embodiment, the portion for performing the function as the video distribution server VS included in the rendering unit RU1 is called as a video distribution server section VS'.

As apprehended from FIG. 17, in the fourth exemplary embodiment, the rendering unit RU1 has a video distribution server section VS' and a section (called as a rendering section R) for performing a function as the rendering unit described in the first or second exemplary embodiments. In addition, the rendering section R has the same structure as the rendering units RU1 to RU4 described in the above-mentioned exemplary embodiments, that is, has a receiving section 121, a video data acquisition section 122, an output control section 123, a frame buffer 124, and an output section 125.

Figure 18:
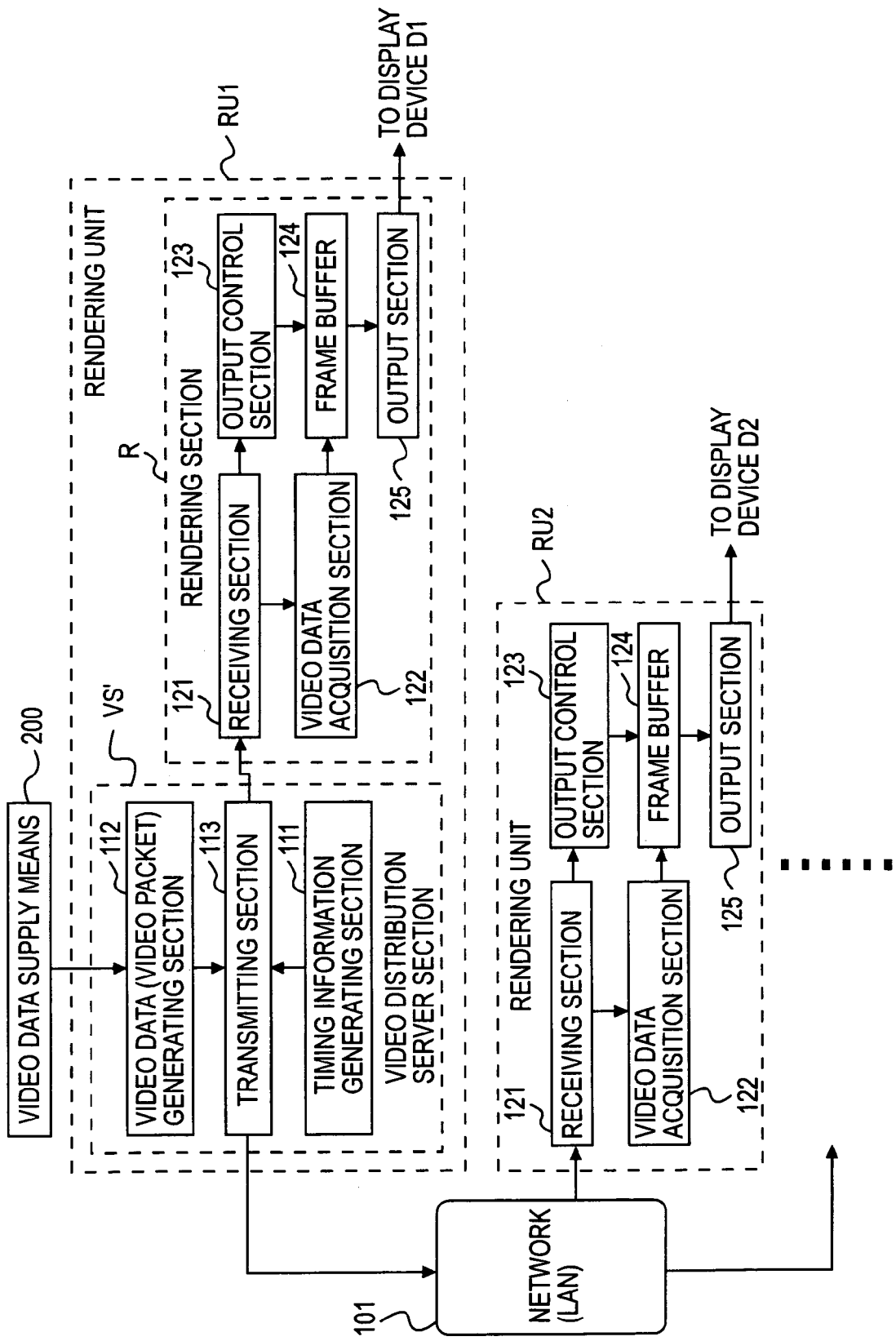
FIG. 18 is a schematic diagram for explaining a structure of a rendering unit in the multi-screen video reproducing system shown in FIG. 17.

FIG. 18 is a schematic diagram for describing the structures of the rendering units RU1 to RU4 in the multi-screen video reproducing system 10 shown in FIG. 17. In addition, the structures of the rendering units RU2 to RU4 other than RU1 are the same as those in FIG. 2. In addition, the video distribution server section VS' provided in the rendering unit RU1 has a timing information generating section 111, a video data (video packet) generating section 112, and a transmitting section 113, similarly to the video distribution server VS shown in FIG. 2.

As such, when the video distribution server section VS' is included in the rendering unit RU1, the video data and display instruction packet from the video distribution server section VS' are distributed to each rendering unit from the transmitting section 113 of the video distribution server section VS'. However, in the case of the rendering unit RU1, the video data and display instruction packet are directly transmitted to the rendering unit RU1 and are distributed to the other rendering units RU2 to RU4 through the LAN 101.

In addition, the video distribution server section VS' can distribute the same video data to each of the rendering units RU1 to RU4 (however, rendering unit R in the case of the rendering unit RU1), similarly to the first exemplary embodiment. In addition, as in the second exemplary embodiment, the different video data can be distributed to each of the rendering units RU1 to RU4 (however, rendering unit R in the case of the rendering unit RU1).

According to the multi-screen video reproducing system 10 of the fourth exemplary embodiment, in addition to obtaining the same effect as the multi-screen video reproducing systems 10 according to the first and second exemplary embodiments, the video distribution server section VS' is included in one rendering unit RU1 so that it is not necessary to independently arrange the video distribution server VS, thereby simplifying the structure of the multi-screen video reproducing system 10.

In addition, as described above, even when the timing server TS is separated from the video distribution server VS, one rendering unit can have the function as the video distribution server VS and the function as the timing server TS. In this case, as described above, the same rendering unit may have the function as the video distribution server VS and the function as the timing server TS. In addition, the different rendering units may have the function as the timing server TS and the function as the video distribution server VS, respectively, such that the rendering unit RU1 has the video distribution server VS and the rendering unit RU2 has the timing server TS.

Fifth Exemplary Embodiment

In the multi-screen video reproducing system 10 according to the fifth exemplary embodiment, each of the display devices D1 to D4 has the function of each of the rendering units RU1 to RU4. In addition, in the fifth exemplary embodiment, portions having the functions of the rendering units RU1 to RU4 included in the display devices D1 to D4 are called as the rendering units RU1' to RU4'. In addition, in the fifth exemplary embodiment, it is assumed that the multi-screen video reproducing system 10 includes the displays D1 to D4.

Figure 19:
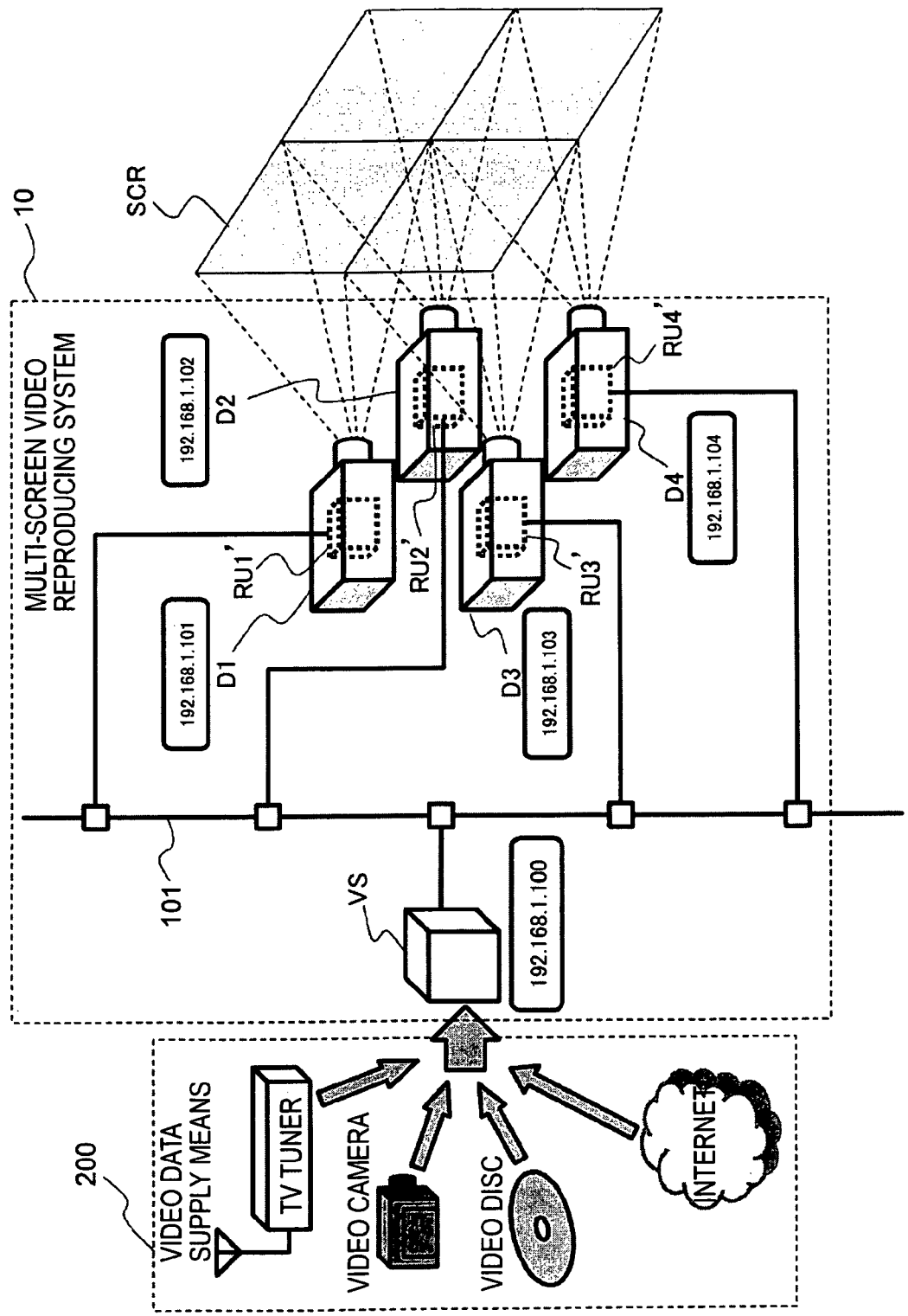
FIG. 19 is a schematic diagram for explaining a structure of a multi-screen video reproducing system according to a fifth exemplary embodiment of the present invention.

FIG. 19 is a schematic diagram for describing the structure of the multi-screen video reproducing system 10 according to the fifth exemplary embodiment of the present invention. The structure of FIG. 19 is the same as that of FIG. 1, except that the display devices D1 to D4 includes the rendering units RU1' to RU4' and the same constituent elements are denoted by the same reference numerals. In other words, in the multi-screen video reproducing system 10 according to the fifth exemplary embodiment, the display device D1 has the rendering unit RU1', the display device D2 has the rendering unit RU2', the display device D3 has the rendering unit RU3', and the display device D4 has the rendering unit RU4'.

Figure 20:
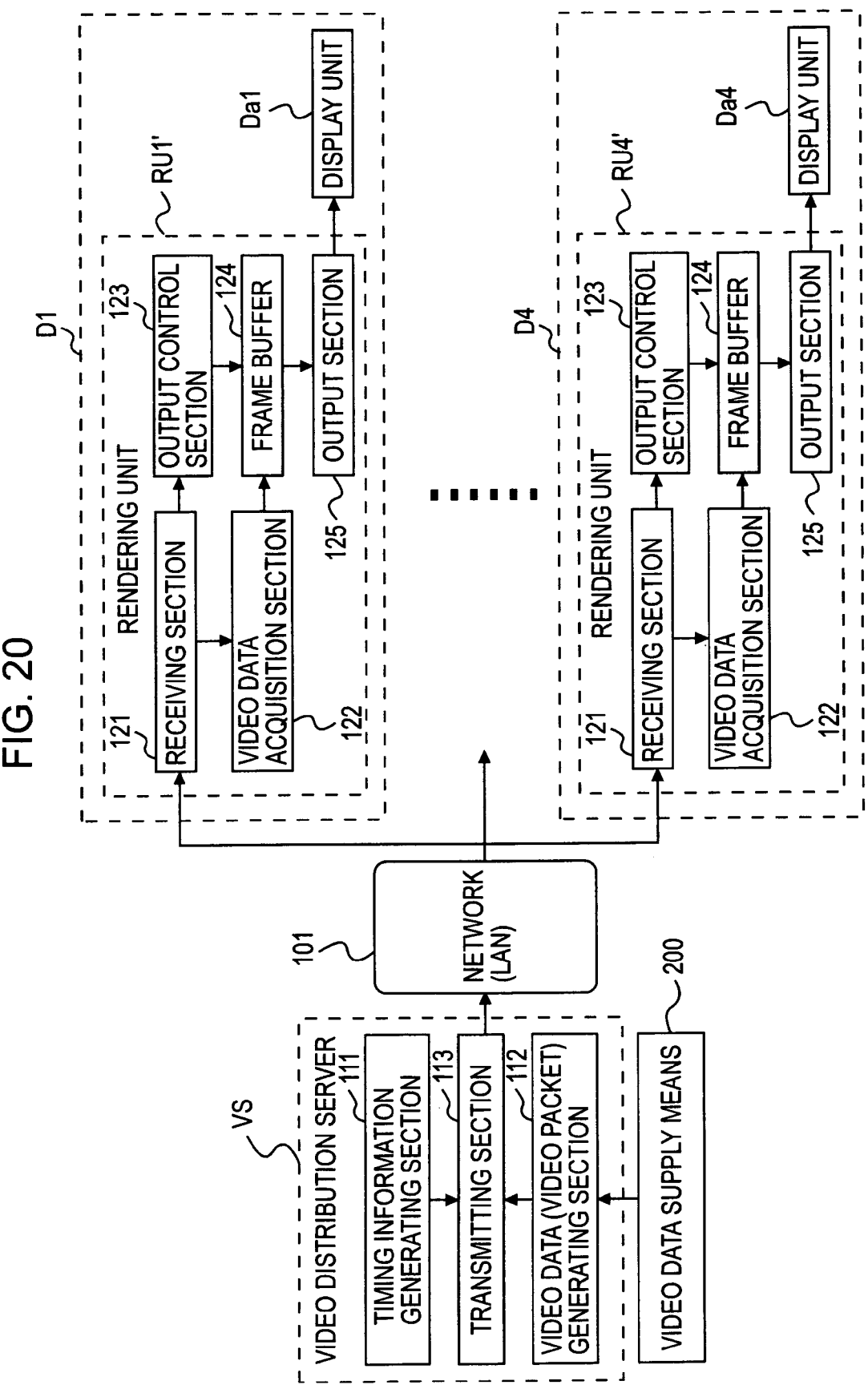
FIG. 20 is a schematic diagram for explaining structures of a video distribution server and a display device in the multi-screen video reproducing system shown in FIG. 19.

FIG. 20 is a schematic diagram for describing the structures of the video distribution server VS and the display devices D1 to D4 in the multi-screen video reproducing system 10. As apprehended from FIG. 20, the video distribution server VS is the same as that of FIG. 1. In addition, the display devices D1 to D4 have the rendering units RU1' to RU4' and the display units (they are indicated by Da1 to Da4) having the functions to display the video data supplied from the rendering units RU1' to RU4'. In addition, the structures of the rendering units RU1' to RU4' are the same as those of the rendering units RU1 to RU4 shown in FIG. 2.

According to the multi-screen video reproducing system 10 of the fifth exemplary embodiment, in addition to obtaining the same effect as the multi-screen video reproducing systems 10 according to the first to third exemplary embodiments, the rendering units RU1' to RU4' are included in the display devices D1 to D4 so that it is not necessary to independently arrange the rendering units RU1 to RU4, thereby simplifying the structure of the multi-screen video reproducing system.

In addition, the rendering units RU1' to RU4' shown in FIGS. 19 and 20 is an example of the rendering units RU1 to RU4 described in the multi-screen video reproducing system 10 according to the first to third exemplary embodiments. As described in the fourth exemplary embodiment, one rendering unit of the rendering units RU1 to RU4 may have the function as the video distribution server VS. In other words, any one of the rendering units RU1' to RU4' shown in FIGS. 19 and 20 may have the function as the video distribution server VS.

As such, when any one of the rendering units RU1' to RU4' has the function as the video distribution server VS, it is not necessary to independently arrange the video distribution server VS, thereby further simplifying the structure of the multi-screen video reproducing system 10.

In addition, similarly to the above-mentioned description even when the timing server TS is provided to be separated from the video distribution server VS, any one of the rendering units RU1' to RU4' shown in FIGS. 19 and 20 may have any one of the function as the video distribution server VS and the function as the timing server TS and both function as the video distribution server VS and function as the timing server TS and the different rendering units may have the function as the timing server TS and the function as the video distribution server VS, respectively.

Sixth Exemplary Embodiment

In the multi-screen video reproducing systems 10 according to the above-mentioned exemplary embodiments, the display instruction packet is distributed to each of the rendering units RU1 to RU4 in frame units, that is, at a frame updating period of the video data. Exemplary embodiments of the present invention are not limited thereto, and, for example, the display instruction packet may be distributed to the plurality of rendering units RU1 to RU4 at every display timing of the partial frame of the video data.

Figure 21:
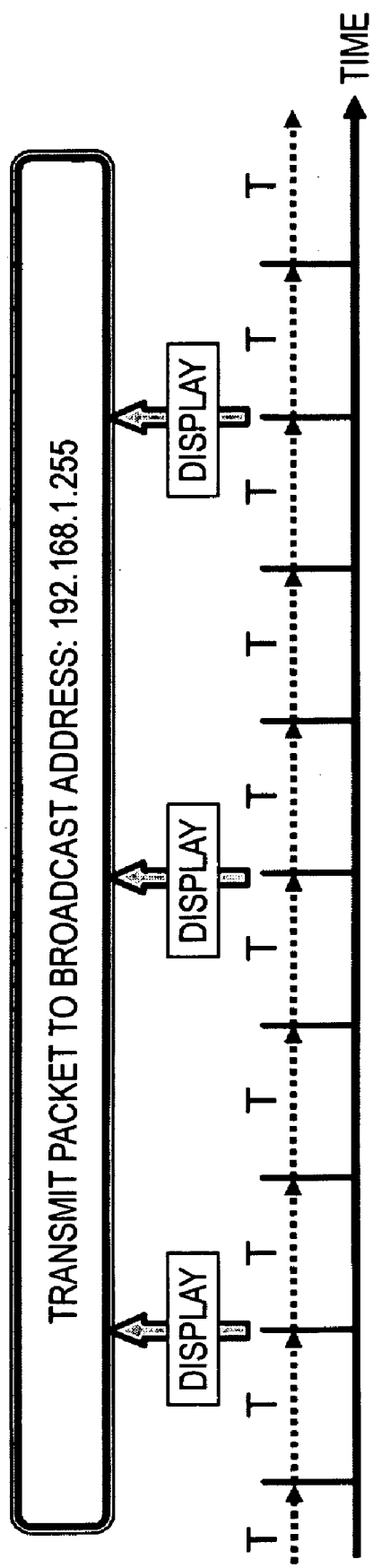
FIG. 21 is a schematic diagram for explaining a distribution timing of a display indicating packet in a multi-screen video reproducing system according to a sixth exemplary embodiment of the present invention.

FIG. 21 is a schematic diagram for describing the distribution timing of the display instruction packet in the multi-screen video reproducing system 10 according to the sixth exemplary embodiment of the present invention. FIG. 21 shows an example that once per three frames, the display instruction packet is distributed to each of the rendering units through the broadcast communication.

Figure 22:
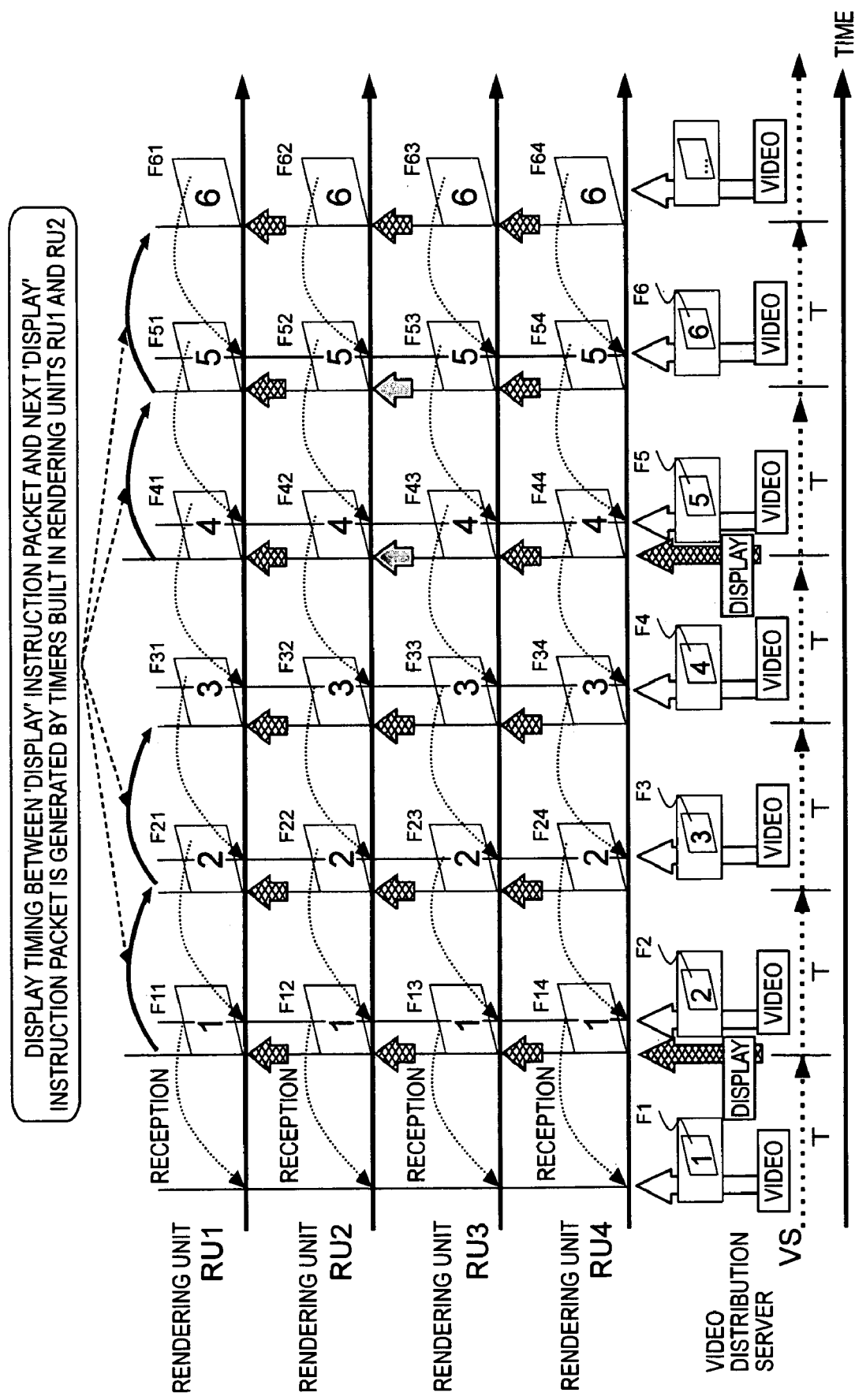
FIG. 22 is a schematic diagram for explaining operation of the multi-screen video reproducing system according to the sixth exemplary embodiment of the present invention.
Figure 23:
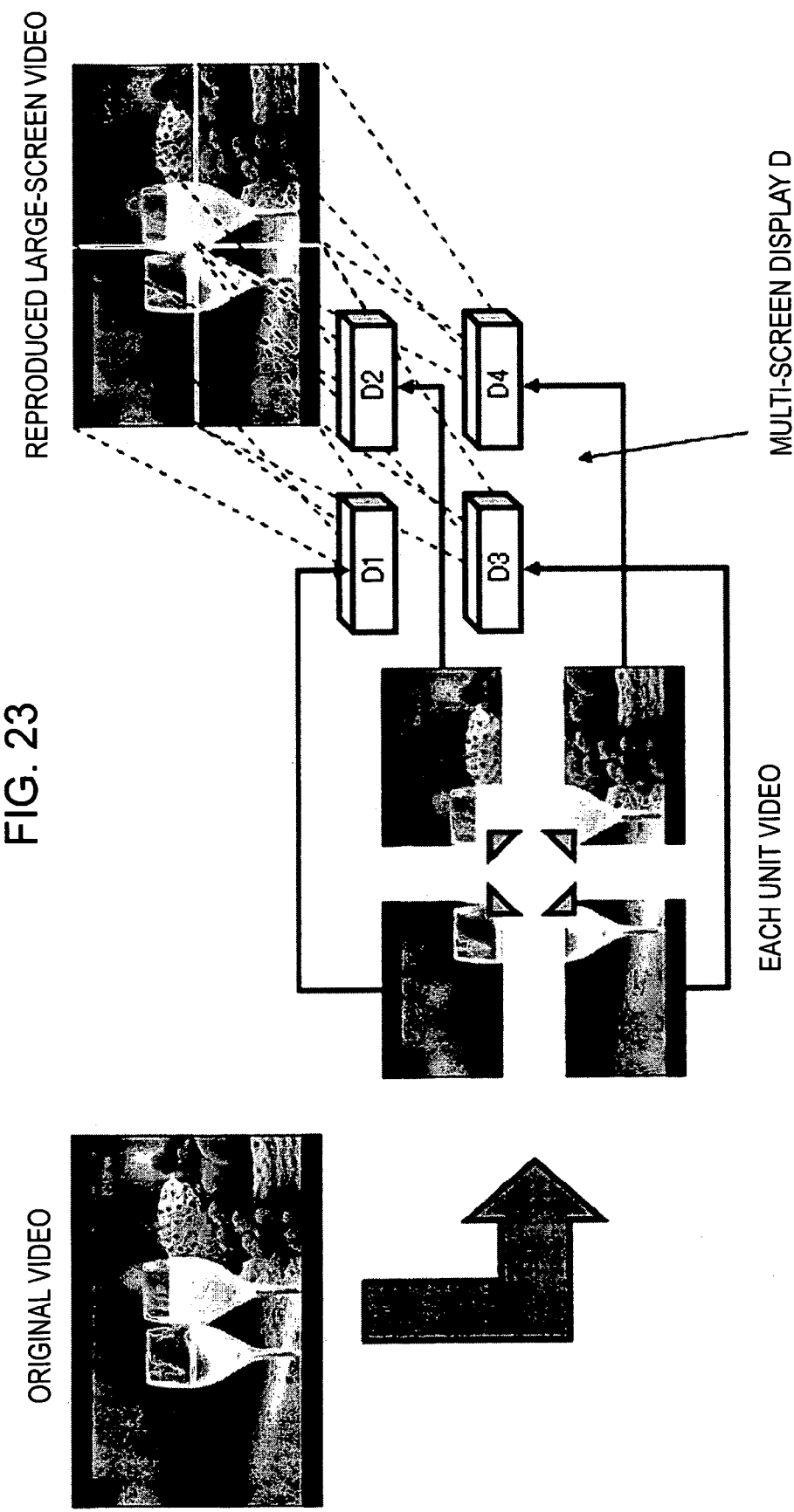
FIG. 23 is a schematic diagram for explaining a multi-screen display.
Figure 24A:
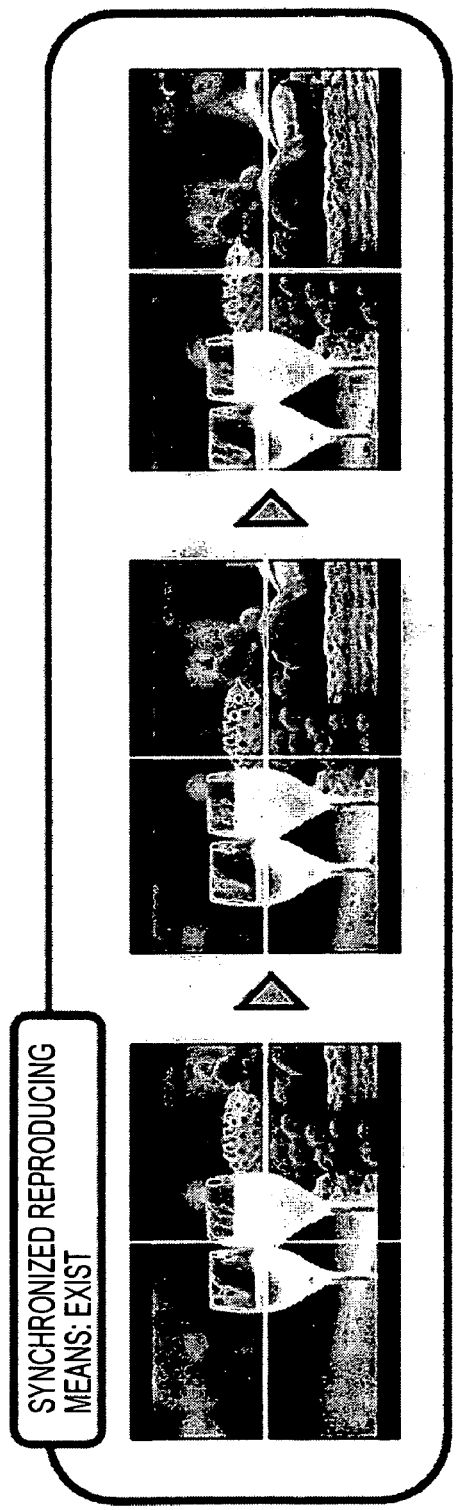
FIG. 24 is a schematic diagram for explaining necessity of synchronized reproducing means in a multi-screen display.
Figure 24B:
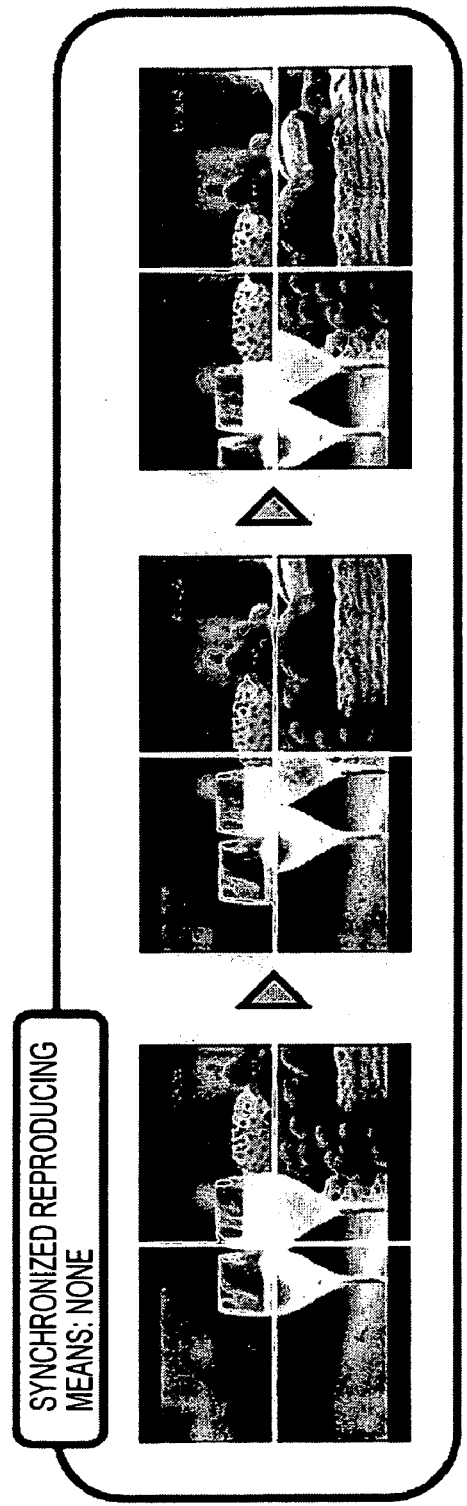
Figure 25A:
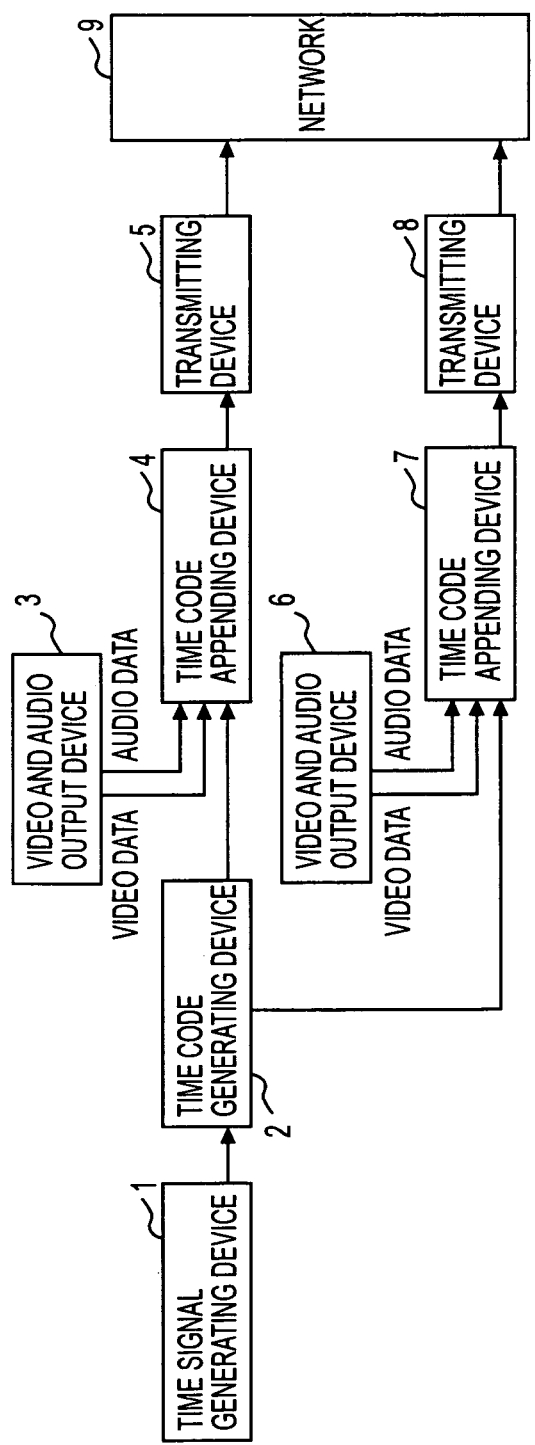
FIG. 25 is a diagram for explaining related art synchronized reproducing means.
Figure 25B:
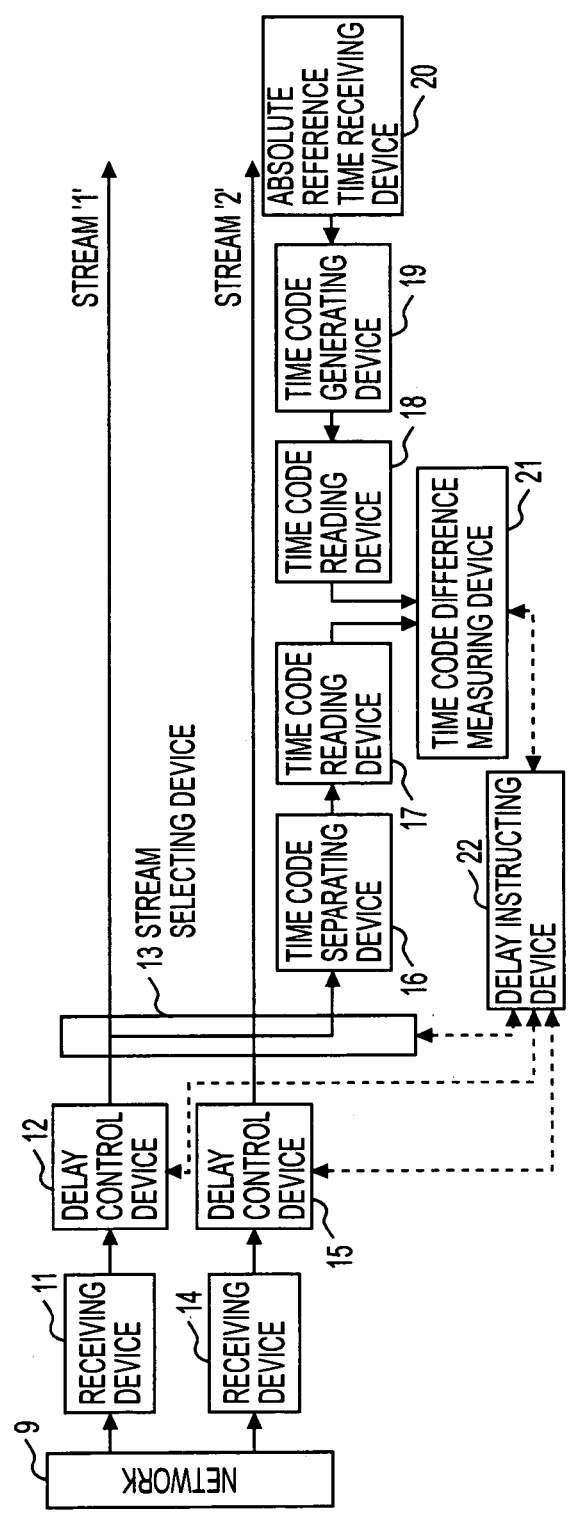
Figure 26:
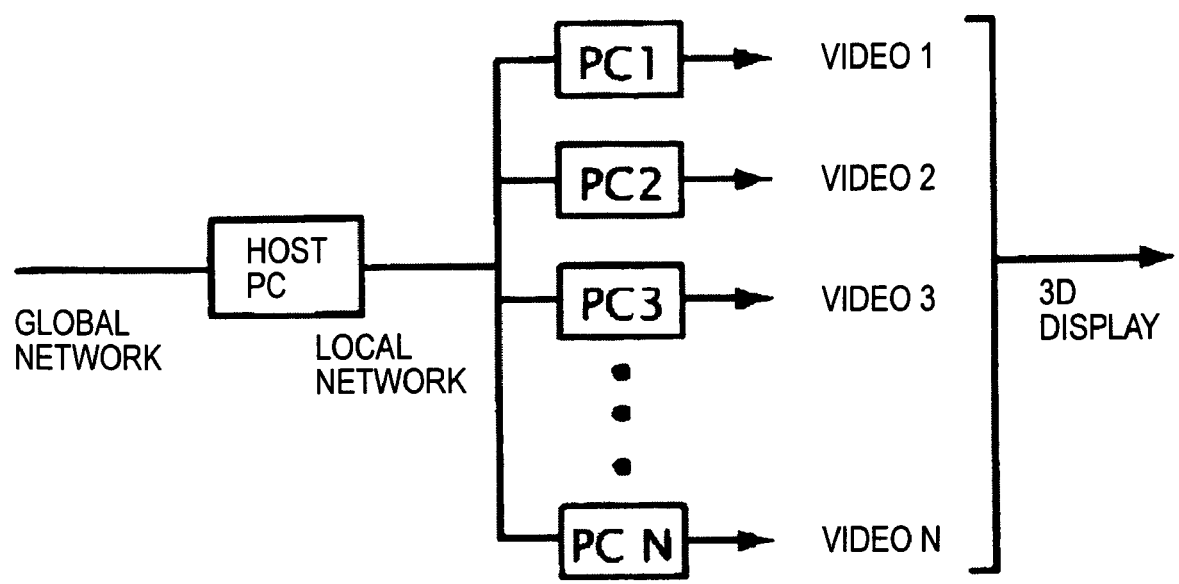
FIG. 26 is a schematic diagram for explaining another related art synchronized reproducing device.

FIG. 22 is a schematic diagram for describing the operation of the multi-screen video reproducing system 10 according to the sixth exemplary embodiment of the present invention. In FIG. 22, after the display instruction packet about a certain frame (in the present exemplary embodiment, a second frame) is distributed from the video distribution server VS, the display instruction packet is distributed to a fifth frame. In this case, the display instruction timings about frames (in the present exemplary embodiment, third and fourth frames) other than the frames whose display instruction packets are distributed can be produced by a timer built in each of the rendering units RU1 to RU4.

In addition, similarly to the above-mentioned description, in frames subsequent to the sixth frame (not shown in FIG. 22), the display instruction packet is distributed to each of the rendering units RU1 to RU4 for every predetermined frame, and the display instruction timings about the frames between the respective display instruction packets are produced by the timers built in the rendering units RU1 to RU4.

As such, the distribution of the display instruction packets to each of the rendering units RU1 to RU4 is performed every partial frame so that the times of the distribution of the timing information through the LAN 101 can be reduced, thereby alleviating the traffic of the LAN.

In addition, in the multi-screen video reproducing systems 10 according to the above-mentioned exemplary embodiments, as the simultaneous broadcast communication, the multicast communication as well as the communication using the broadcast communication can be adopted. Also in this case, the video distribution server VS can easily perform the simultaneous broadcast communication with respect to each of the rendering units RU1 to RU4 connected to the LAN 101. In addition, when adopting the multicast communication, the same multicast address, for example, 224.0.0.1 is assigned to all of the rendering units constituting the multi-screen video reproducing system so that the video distribution server VS may transmit the display instruction packet forming the synchronizing signal to the multicast address destinations.

In addition, since the respective display devices D1 to D4 constituting the multi-screen display are generally arranged at locations adjacent to each other, it is not necessarily necessary to use as the network a large-sized network such as a wide area network. Therefore, in the multi-screen video reproducing systems 10 according to the above-mentioned exemplary embodiments, the local area network (LAN) is used as the network.

Thereby, the packet loss or the difference in the arrival time of the display instruction packets to the respective rendering units RU1 to RU4 can be easily reduced so as to become smaller than an allowable value and it is possible to easily address or achieve the simultaneous broadcast communication with high time accuracy. As a result, the synchronized reproduction with high accuracy can be addressed or achieved between the display devices D1 to D4 and it is possible to re produce the video with smooth and natural as a whole.

In addition, the small-sized, closed network is preferably used as the LAN 101. The packet loss or the difference in the arrival time of the display instruction packets to the respective rendering units RU1 to RU4 can be further reduced so as to become smaller than an allowable value.

In addition, in the multi-screen video reproducing systems 10 according to the above-mentioned exemplary embodiments, TCP/IP is used as the communication protocol used for the LAN 101. In the multi-screen video reproducing system, various protocols can be used as the communication protocol. However, by using the TCP/IP protocol spread widely in recent times, it is possible to easily constitute the network with low cost and reliability.

In addition, in the frame buffer 124 of each of the rendering units RU1 to RU4, the video data for one frame is buffered. However, the multi-screen video reproducing system of exemplary embodiments of the present invention are not limited thereto, the video data of more than two frames may be buffered in each frame buffer 124. In this case, since the video data for more than one frame is previously read out, it is possible to perform the efficient buffering.

In addition, each of the rendering units RU1 to RU4 may have the frame buffer for expanding the video data of the frame unit transmitted from the video distribution server VS and does not need to have a large-scale recording medium (hard disk or the like) to record the video data itself.

In addition, when each of the rendering units RU1 to RU4 has a margin in time until the each of the rendering units RU1 to RU4 receive the display instruction packet from the video distribution server VS, the flexible image process can be performed in the range in which a real-time process between the frame rates can be performed.

In the above-mentioned description, the multi-screen video reproducing system and the video synchronization recovery method in the multi-screen video reproducing system of exemplary embodiments of the present invention are described. However, exemplary embodiments of the present invention are not limited to the above-mentioned exemplary embodiments and various exemplary modifications can be made therein without departing from the spirit and scope of exemplary embodiments of the invention. For example, the following exemplary modifications can be made.

(1) The multi-screen video reproducing system according to the above-mentioned exemplary embodiments has the network, however, exemplary embodiments of the present invention may not have the network. In this case, when a separated network is arranged, it is possible to constitute the multi-screen video reproducing system according to the above-mentioned exemplary embodiments and it is possible to obtain the same effect.

(2) In each of the above-mentioned exemplary embodiments, it is described that the video distribution server VS, the timing server TS and the rendering units RU1 to RU4 are configured as the separated hardware, respectively, but these may be integrated with each other. In addition, the video distribution server VS, the timing server TS and the rendering units RU1 to RU4 are all assembled with each other such that exemplary embodiments of the present invention can be achieved by only using the display device (for example, projector) and the exemplary embodiments may assume the different types.

(3) In the multi-screen video reproducing system according to each of the exemplary embodiments, the case in which one large-screen video is reproduced by using the large-screen multi-screen display is exemplified, but exemplary embodiments of the present invention are not limited thereto. For example, exemplary embodiments of the present invention can also be applied to the case in which the respective display devices of the multi-screen display synchronize and reproduce the videos having the different points of view photographed by the different cameras in the sports or play.

(4) In the multi-screen video reproducing system according to each of the exemplary embodiments, the arrangement of the case in which the plurality of display devices D1 to D4 constitutes the multi-screen display like the tiling display is described. However, the multi-screen video producing system of exemplary embodiments of the present invention can also be applied to the case in which a plurality of users plays the same game at different locations while the users see the respective displays. Therefore, the respective display devices D1 to D4 may be scattered in all directions.

In addition, exemplary embodiments of the present invention may prepare the video reproducing program of the multi-screen video reproducing system in which the video synchronization recovery sequence in the multi-screen video reproducing system is described for addressing or achieving exemplary embodiments of the present invention and record the video reproducing program on the recording mediums such as a floppy disk, an optical disk and a hard disk. Therefore, exemplary embodiments of the present invention include the recording medium in which the video reproducing program of the multi-screen video reproducing system is recorded. In addition, the video reproducing program of the multi-screen video reproducing system may be obtained from the network.

What is claimed is:

1. A multi-screen video reproducing system, comprising:
a network;
a plurality of display devices, each of the plurality of display devices displaying a partial image of an image;
a plurality of rendering units connected to the network, each of the plurality of rendering units outputting partial video data corresponding to the partial image allocated to each of the plurality of rendering units to a corresponding display device of the plurality of display devices; and
a video distribution server connected to the network to distribute same video data representing the image to each of the plurality of rendering units and to distribute timing information, to output synchronized video data from the plurality of rendering units to the corresponding display devices, to the plurality of rendering units through a simultaneous broadcast communication, the timing information being distributed at a predetermined timing after the distribution of the same video data,
the video distribution server including a video data generating section to generate the same video data to be distributed to the plurality of rendering units: a timing information generating section to generate the timing information; and a transmitting section to distribute to the plurality of rendering units the same video data generated by the video data generating section or the timing information generated by the timing information generating section, and each of the rendering units including a receiving section to receive the same video data or the timing information distributed by the transmitting section; a frame buffer to expand the same video data received by the receiving section; an output control section to control the frame buffer based on the timing information received by the receiving section; and an output section to output the partial video data expanded by the frame buffer to the corresponding display device.

2. The multi-screen video reproducing system according to claim 1, the video distribution server individually distributing the same video data to the plurality of rendering units.

3. The multi-screen video reproducing system according to claim 1, the video distribution server distributing the timing information to the plurality of rendering units at every frame update period of the same video data.

4. The multi-screen video reproducing system according to claim 1, the video distribution server distributing the timing information to the plurality of rendering units at every display timing of all frames of the same video data.

5. The multi-screen video reproducing system according to claim 1, the video distribution server distributing the timing information to the plurality of rendering units at every display timing of a part of frames of the same video data.

6. The multi-screen video reproducing system according to claim 1, the simultaneous broadcast communication being a broadcast communication.

7. The multi-screen video reproducing system according to claim 1, the simultaneous broadcast communication being a multicast communication.

8. The multi-screen video reproducing system according to claim 1, the network being a local area network.

9. The multi-screen video reproducing system according to claim 1, a communication protocol used for the network being TCP/IP.

10. The multi-screen video reproducing system according to claim 1, the frame buffer having a region capable of storing a plurality of frames of the same video data.

11. The multi-screen video reproducing system according to claim 10, the frame buffer having the region capable of storing the plurality of frames of the same video data including two frame buffers which constitute double buffering and have a mutually complementary relationship.

12. The multi-screen video reproducing system according to claim 1, any one of the plurality of rendering units functioning as the video distribution server.

13. The multi-screen video reproducing system according to claim 1, the plurality of display devices being a plurality of display devices constituting a multi-screen display, and the multi-screen video reproducing system being a multi-screen video reproducing system to output synchronized video data to each of the plurality of display devices.

14. A multi-screen video reproducing system, comprising:

a plurality of display devices, each of the plurality of display devices displaying a partial image of an image;

a plurality of rendering units which have a network interface and a function to output to a corresponding display device of the plurality of display devices partial video data corresponding to the partial image allocated to each of the plurality of rendering units acquired through the network interface; and a video distribution server which has a network interface, to distribute same video data representing the image to each of the plurality of rendering units through the network interface and a function to distribute timing information to output synchronized video data from the plurality of rendering units to the corresponding display devices, to the plurality of rendering units through a simultaneous broadcast communication via the network interface, the timing information being distributed at a predetermined timing after the distribution of the same video data, the video distribution server including a video data generating section to generate the same video data to be distributed to the plurality of rendering units; a timing information generating section to generate the timing information; and a transmitting section to distribute to the plurality of rendering units the same video data generated by the video data generating section or the timing information generated by the timing information generating section, and each of the rendering units including a receiving section to receive the same video data or the timing information distributed by the transmitting section; a frame buffer to expand the same video data received by the receiving section; an output control section to control the frame buffer based on the timing information received by the receiving section: and an output section to output the partial video data expanded by the frame buffer to the corresponding display device.

15. The multi-screen video reproducing system according to claim 14, the plurality of display devices being a plurality of display devices constituting a multi-screen display, and the multi-screen video reproducing system being a multi-screen video reproducing system to output the synchronized video data to each of the plurality of display devices.

16. A multi-screen video reproducing system, comprising:

a network;

a plurality of display devices, each of the plurality of display devices displaying a partial image of an image;

a plurality of rendering units connected to the network to output partial video data corresponding to the partial image allocated to each of the plurality of rendering units to a corresponding display device of the plurality of display devices;

a video distribution server connected to the network to distribute same video data representing the image to each of the plurality of rendering units; and a timing server connected to the network to distribute to the plurality of rendering units, through a simultaneous broadcast communication, timing information to output synchronized video data from the plurality of rendering units to the corresponding display devices, the timing information being distributed at a predetermined timing after the distribution of the same video data, the timing server including a timing information generating section to generate the timing information; a video distribution control information generating section to generate video distribution control information concerning the video distribution server; and a transmitting section to output the timing information or the video distribution control information, the video distribution server including a video distribution control section to control the video distribution to the plurality of rendering units based on the video distribution control information generated by the video distribution control information generating section of the timing server; a video data generating section to generate the same video data to be distributed to the plurality of rendering units based on the control by the video distribution control section; and a transmitting section to distribute to the plurality of rendering units the same video data generated by the video data generating section, and each of the rendering units including a receiving section to receive the same video data or the timing information distributed from the transmitting section; a frame buffer to expand the same video data received by the receiving section; an output control section to control the frame buffer based on the timing information received by the receiving section; and an output section to output the partial video data expanded in the frame buffer to the corresponding display device.

17. The multi-screen video reproducing system according to claim 16, any one of the plurality of rendering units functioning as at least one of the video distribution server and the timing server.

18. The multi-screen video reproducing system according to claim 16, the plurality of display devices being a plurality of display devices constituting a multi-screen display, and the multi-screen video reproducing system being multi-screen video reproducing system to output the synchronized video data to each of the plurality of display devices.

19. A multi-screen video reproducing system, comprising:

a plurality of display devices, each of the plurality of display devices displaying a partial image of an image;

a plurality of rendering units having a network interface and outputting partial video data corresponding to the partial image allocated to each of the plurality of rendering units acquired through the network interface to a corresponding display device of the plurality of display devices;

a video distribution server having a network interface and distributing same video data representing the image to each of the plurality of rendering units through the network interface; and a timing server having a network interface and distributing to the plurality of rendering units, through a simultaneous broadcast communication via the network interface, timing information to output synchronized video data from the plurality of rendering units to the corresponding display devices, the timing information being distributed at a predetermined timing after the distribution of the same video data, the video distribution server including a video data generating section to generate the same video data to be distributed to the plurality of rendering units; and a transmitting section to distribute to the plurality of rendering units the same video data generated by the video data generating section, and each of the rendering units including a receiving section to receive the same video data or the timing information; a frame buffer to expand the same video data received by the receiving section; an output control section to control the frame buffer based on the timing information received by the receiving section; and an output section to output the partial video data expanded by the frame buffer to the corresponding display device.

20. The multi-screen video reproducing system according to claim 19, the plurality of display devices being a plurality of display devices constituting a multi-screen display, and the multi-screen video reproducing system being a multi-screen video reproducing system to output the synchronized video data to each of the plurality of display devices.

21. A video reproducing method of a multi-screen video reproducing system including a plurality of rendering units to output partial video data corresponding to the partial image allocated to each of the plurality of rendering units to a corresponding display device of a plurality of display devices; and a video distribution server to distribute same video data representing the image to each of the plurality of rendering units and to distribute to the plurality of rendering units, through a simultaneous broadcast communication, timing information to output synchronized video data from the plurality of rendering units to the corresponding display devices, the multi-screen video reproducing system outputting the synchronized video data to each of the plurality of display devices, the video reproducing method comprising:

generating the same video data to be distributed to the plurality of rendering units by the video distribution server;

generating the timing information by the video distribution server;

distributing the same video data to the plurality of rendering units;

distributing the timing information to the plurality of rendering units through a simultaneous broadcast communication at a predetermined timing after the distribution of the video data;

receiving the same video data or the timing information by the plurality of rendering units;

expanding the same video data received by the plurality of rendering units;

controlling the frame buffer based on the timing information received by the plurality of rendering units; and outputting the partial video data to corresponding display devices on the basis of the timing information, when receiving the timing information distributed from the video distribution server after the reception of the video data distributed from the video distribution server.

22. The video reproducing method of the multi-screen video reproducing system according to claim 21, outputting by the multi-screen video reproducing system, the synchronized video data to each of the plurality of display devices constituting a multi-screen display.

23. A video reproducing method of a multi-screen video reproducing system including a plurality of rendering units to output partial video data corresponding to the partial image allocated to each of the plurality of rendering units to a corresponding display device of a plurality of display devices; a video distribution server having a function to distribute same video data representing the image to each of the plurality of rendering units; and a timing server having a function to distribute to the plurality of rendering units, through a simultaneous broadcast communication, timing information to output synchronized video data from the plurality of rendering units to the corresponding display devices, the multi-screen video reproducing system outputting the synchronized video data to each of the plurality of display devices, the video reproducing method comprising:

generating the same video data to be distributed to the plurality of rendering units by the video distribution server;

generating the timing information by the video distribution server;

distributing the same video data to the plurality of rendering units performed by the video distribution server;

distributing the timing information to the plurality of rendering units through a simultaneous broadcast communication at a predetermined timing after the distribution of the video data by the video distribution server, performed by the timing server;

receiving the same video data or the timing information by the plurality of rendering units;

expanding the same video data received by the plurality of rendering units;

controlling the frame buffer based on the timing information received by the plurality of rendering units; and outputting, using the plurality of rendering units, the partial video data to corresponding display devices on the basis of the timing information, when receiving the timing information distributed from the timing server after the reception of the video data distributed from the video distribution server.

24. The video reproducing method of the multi-screen video reproducing system according to claim 23, outputting, using the multi-screen video reproducing system, the synchronized video data to each of the plurality of display devices constituting a multi-screen display.

25. A video distribution server for use with a plurality of rendering units and a plurality of display devices, comprising:

a first device to generate the same video data to he distributed to the plurality of rendering units;

a second device to generate the timing information;

a third device to distribute to the plurality of rendering units, through a simultaneous broadcast communication, timing information to output synchronized video data from the plurality of rendering units to the corresponding display devices, the timing information being distributed at a predetermined timing after the distribution of the video data;

a fourth device to distribute to the plurality of rendering units the same video data generated by the video data generating section or the timing information generated by the timing information generating section, and wherein the rendering units receive the same video data or the timing information, expand the same video data received, control a frame buffer based on the timing information; and output the partial video data to a corresponding display device.

26. The video distribution server according to claim 25, the video distribution server being video distribution server used in a multi-screen video reproducing system, and the multi-screen video reproducing system including a network; and a plurality of rendering units connected to the network to output partial video data corresponding to the partial image allocated to each of the plurality of rendering units to a corresponding display device of the plurality of display devices;

the video distribution server distributing the same video data to the plurality of rendering units.

27. A rendering unit for use with a video distribution server, comprising:

a first device to output partial video data corresponding to a partial image of an image allocated to the rendering unit among a plurality of the rendering units, each of the plurality of rendering units receiving same video data representing the image distributed from the video distribution server to a corresponding display device based on timing information distributed from the video distribution server, the timing information being distributed at a predetermined timing after the distribution of the video data;

a second device to receive the same video data or the timing information;

a third device to expand the same video data;

a fourth device to control a frame buffer based on the timing information; and a fifth device to output the partial video data expanded by the frame buffer to the corresponding display device, wherein the video distribution server includes a video data generating section to generate the same video data to be distributed to the plurality of rendering units; a timing information generating section to generate the timing information; and a transmitting section to distribute to the plurality of rendering units the same video data generated by the video data generating section or the timing information generated by the timing information generating section.

28. The rendering unit according to claim 27, the rendering unit being a rendering unit used in a multi-screen video reproducing system, and the multi-screen video reproducing system including a network; a plurality of display devices; a plurality of the rendering units connected to the network to output the partial video data to a corresponding display device of the plurality of display devices; and a video distribution server to distribute the same video data to the plurality of rendering units and to distribute to the plurality of rendering units, through a simultaneous broadcast communication, timing information to output synchronized video data from the plurality of rendering units to the corresponding display devices.

29. A rendering unit for use with a video distribution server, comprising:

a first device to output partial video data corresponding to the partial image of an image allocated to each of the plurality of rendering units distributed from the video distribution server to a corresponding display device based on timing information distributed from a timing server, the timing information being distributed at a predetermined timing after the distribution of the video data;

a second device to receive the same video data or the timing information;

a third device to expand the same video data;

a fourth device to control a frame buffer based on the timing information; and a fifth device to output the partial video data expanded by the frame buffer to the corresponding display device, wherein the video distribution server includes a video data generating section to generate the same video data to be distributed to the plurality of rendering units; a timing information generating section to generate the timing information; and a transmitting section to distribute to the plurality of rendering units the same video data generated by the video data generating section or the timing information generated by the timing information generating section.

30. The rendering unit according to claim 29, the rendering unit being a rendering unit used in a multi-screen video reproducing system, and the multi-screen video reproducing system including a network; a plurality of display devices; a plurality of the rendering units connected to the network to output the partial video data to a corresponding display device of the plurality of display devices; a video distribution server connected to the network to distribute the same video data to the plurality of rendering units; and a timing server connected to the network to distribute to the plurality of rendering units, through a simultaneous broadcast communication, timing information to output synchronized video data from the plurality of rendering units to the corresponding display devices.

31. A timing server for use with a plurality of rendering units and a video distribution server, comprising:

a device to distribute to the plurality of rendering units, through a simultaneous broadcast communication, timing information to output synchronized video data from the plurality of rendering units to the corresponding display devices, the timing information being distributed at a predetermined timing after the distribution of video data by a video distribution server, wherein the video distribution server includes a video data generating section to generate same video data representing an image to he distributed to the plurality of rendering units; and a transmitting section to distribute to the plurality of rendering units the same video data generated by the video data generating section, and the rendering units receive the same video data or the timing information, expand the same video data received, control a frame buffer based on the timing information; and output partial video data to the corresponding display device corresponding to the partial image allocated to each of the plurality of rendering units.

32. The timing server according to claim 31, the timing server being a timing server used in a multi-screen video reproducing system, and the multi-screen video reproducing system including a network; a plurality of display devices; a plurality of rendering units connected to the network to output partial video data corresponding to the partial image allocated to each of the plurality of rendering units to a corresponding display device of the plurality of display devices; the video distribution server connected to the network to distribute same video data representing the image to the plurality of rendering units;

the timing server connected to the network distributing to the plurality of rendering units, through the simultaneous broadcast communication, the timing information to output synchronized video data from the plurality of rendering units to the corresponding display devices.

33. A display device, comprising:

a device to output partial video data corresponding to a partial image of an image allocated to the rendering unit among a plurality of the rendering units, each of the plurality of rendering units receiving same video data representing the image distributed from a video distribution server to a display section based on timing information distributed from the video distribution server, the timing information being distributed at a predetermined timing after the distribution of the video data, wherein the video distribution server includes a video data generating section to generate the same video data to be distributed to the plurality of rendering units; a timing information generating section to generate the timing information; and a transmitting section to distribute to the plurality of rendering units the same video data generated by the video data generating section or the timing information generated by the timing information generating section, and the rendering units receive the same video data or the timing information distributed by the transmitting section, expand the same video data received, control a frame buffer based on the timing information; and output the partial video data to the corresponding display device.

34. A display device, comprising:

a rendering unit to output video data distributed from a video distribution server to a display section based on timing information distributed from a timing server, the timing information being distributed at a predetermined timing after the distribution of the video data, wherein the video distribution server includes a video data generating section to generate the same video data to be distributed to the plurality of rendering units; a timing information generating section to generate the timing information; and a transmitting section to distribute to the plurality of rendering units the same video data generated by the video data generating section or the timing information generated by the timing information generating section, and the rendering units receive the same video data or the timing information distributed by the transmitting section, expand the same video data received, control a frame buffer based on the timing information; and output the partial video data to the corresponding display device.

* * * * *